United States Patent
Hollinger et al.

(10) Patent No.: US 10,962,336 B2
(45) Date of Patent: *Mar. 30, 2021

(54) DARTBOARD SCORING SYSTEM

(71) Applicant: Indian Industries, Inc., Evansville, IN (US)

(72) Inventors: Herbert A. Hollinger, Mount Vernon, IN (US); Jeremy W. Aldridge, Evansville, IN (US); Mike E. Ciholas, Evansville, IN (US); Justin E. Bennett, Newburgh, IN (US); Paul R. Blaylock, Evansville, IN (US)

(73) Assignee: Indian Industries, Inc., Evansville, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/560,155

(22) Filed: Sep. 4, 2019

(65) Prior Publication Data

US 2020/0018576 A1 Jan. 16, 2020

Related U.S. Application Data

(63) Continuation of application No. 15/493,337, filed on Apr. 21, 2017, now Pat. No. 10,443,987.

(Continued)

(51) Int. Cl.
*F41J 5/02* (2006.01)
*G06T 7/73* (2017.01)
(Continued)

(52) U.S. Cl.
CPC ............. *F41J 5/02* (2013.01); *A63F 11/0051* (2013.01); *F41J 3/0009* (2013.01); *F41J 5/14* (2013.01); *G06T 7/13* (2017.01); *G06T 7/73* (2017.01); *G06T 2207/10012* (2013.01); *G06T 2207/10016* (2013.01); *G06T 2207/30221* (2013.01)

(58) Field of Classification Search
CPC ..................................... F41J 3/02; F41J 5/02
See application file for complete search history.

(56) References Cited

U.S. PATENT DOCUMENTS 2,501,218 A 3/1950 Hill
3,454,276 A 7/1969 Brenkert et al.
(Continued)

FOREIGN PATENT DOCUMENTS

WO WO 1998/031979 7/1998
WO WO-9831979 A1 * 7/1998 ................. F41J 5/02

*Primary Examiner* — Steven J Hylinski
(74) *Attorney, Agent, or Firm* — Woodard Emhardt Henry Reeves & Wagner LLP

(57) ABSTRACT

A system for scoring darts that includes multiple cameras placed substantially parallel to the surface of a dartboard. With a field of view extending across the board, the cameras can be configured to capture images of darts projecting outwardly from the board as they are thrown, and the system can use this image data to calculate the location of each dart, and the corresponding score. Various algorithms may be used to orient the system and calibrate the system to account for irregularities in the images captured by the cameras to accurately determine the location. Proper scoring may be achieved for a variety of dartboards with different patterns of scoring regions based on game rules and corresponding board configurations maintained by the system.

29 Claims, 14 Drawing Sheets

US 10,962,336 B2

Page 2

Related U.S. Application Data

(60) Provisional application No. 62/325,500, filed on Apr. 21, 2016.

(51) Int. Cl.
  *G06T 7/13* (2017.01)
  *F41J 5/14* (2006.01)
  *F41J 3/00* (2006.01)
  *A63F 11/00* (2006.01)

(56) References Cited

U.S. PATENT DOCUMENTS

| | | |
|---|---|---|
| 3,604,707 A | 9/1971 | Hurley |
| 3,624,401 A * | 11/1971 | Stoller ................ F41J 5/02 250/373 |
| 3,790,173 A | 2/1974 | Callaway |
| 3,793,481 A * | 2/1974 | Ripley ................ F41J 5/12 348/139 |
| 3,805,030 A | 4/1974 | Wichinsky et al. |
| 3,836,148 A | 9/1974 | Manning |
| 3,972,531 A | 8/1976 | Knapp |
| 4,216,968 A | 8/1980 | Yeeda |
| 4,244,583 A | 1/1981 | Wood et al. |
| 4,266,780 A | 5/1981 | McQuary |
| 4,286,323 A | 8/1981 | Meday |
| 4,333,657 A | 6/1982 | Jaworski et al. |
| 4,415,162 A | 11/1983 | Sheppard |
| 4,561,660 A | 12/1985 | Zammuto |
| 4,567,461 A | 1/1986 | Honekman et al. |
| 4,586,716 A | 5/1986 | Brejcha et al. |
| 4,635,940 A | 1/1987 | Kelley |
| 4,659,090 A | 4/1987 | Kustanovich |
| 4,678,194 A | 7/1987 | Bowyer et al. |
| 4,768,789 A | 9/1988 | Clark |
| 4,789,932 A * | 12/1988 | Cutler ................ F41J 5/02 700/92 |
| 4,793,618 A * | 12/1988 | Tillery ................ F41J 3/00 273/376 |
| 4,804,193 A | 2/1989 | Lin et al. |
| 4,807,887 A | 2/1989 | DeVale et al. |
| 4,824,121 A | 4/1989 | Beall et al. |
| 4,852,888 A | 8/1989 | Ross et al. |
| 4,881,744 A | 11/1989 | Hansen |
| 4,948,148 A | 8/1990 | Danielson |
| 4,955,967 A | 9/1990 | Houriet, Jr. et al. |
| 4,974,857 A | 12/1990 | Beall et al. |
| 4,976,441 A | 12/1990 | Kim |
| 5,004,247 A | 4/1991 | Menke |
| 5,020,806 A | 6/1991 | Martin |
| 5,054,792 A | 10/1991 | Danielson |
| 5,114,155 A | 5/1992 | Tillery et al. |
| 5,116,063 A | 5/1992 | Harlan et al. |
| 5,156,643 A | 10/1992 | Grubek |
| 5,193,817 A | 3/1993 | Pan |
| 5,245,177 A * | 9/1993 | Schiller ................ G01V 8/20 250/221 |
| 5,292,135 A | 3/1994 | Menke |
| 5,314,195 A | 5/1994 | Schulze |
| 5,318,319 A | 6/1994 | Jones et al. |
| 5,338,032 A | 8/1994 | Latham |
| 5,358,253 A | 10/1994 | Chen |
| 5,366,230 A | 11/1994 | Sanquinetti-Trigo |
| 5,370,306 A | 12/1994 | Schulze et al. |
| 5,384,561 A | 1/1995 | Smith |
| 5,401,033 A | 3/1995 | Lychock, Jr. |
| 5,462,283 A | 10/1995 | Allen |
| 5,486,007 A | 1/1996 | Stewart et al. |
| 5,531,451 A | 7/1996 | Yiu |
| 5,536,017 A | 7/1996 | Salisian |
| 5,540,445 A | 7/1996 | Lee |
| 5,552,758 A | 9/1996 | Tobin |
| 5,553,850 A | 9/1996 | Savu et al. |
| 5,553,861 A | 9/1996 | Pan |
| 5,555,840 A | 9/1996 | Fougere |
| 5,556,103 A | 9/1996 | Quetglas Arino |
| 5,559,490 A | 9/1996 | McDonald et al. |
| 5,560,617 A | 10/1996 | Liang |
| 5,577,733 A * | 11/1996 | Downing ................ F41J 1/10 250/222.2 |
| 5,593,349 A | 1/1997 | Miguel et al. |
| 5,613,685 A | 3/1997 | Stewart et al. |
| 5,648,752 A | 7/1997 | Alfrey |
| 5,649,706 A | 7/1997 | Treat, Jr. et al. |
| 5,662,333 A | 9/1997 | Allen |
| 5,664,782 A | 9/1997 | Lacks et al. |
| 5,681,044 A | 10/1997 | Houriet, Jr. et al. |
| 5,711,528 A | 1/1998 | Pan |
| 5,718,433 A | 2/1998 | Lu et al. |
| 5,743,534 A | 4/1998 | Pan |
| 5,755,443 A | 5/1998 | Luang |
| 5,829,755 A | 11/1998 | Chen |
| 5,855,516 A | 1/1999 | Eiba |
| 5,857,912 A * | 1/1999 | Freitag ................ F41J 3/02 273/371 |
| 5,882,111 A | 3/1999 | Chen |
| 5,934,677 A | 8/1999 | Yiu |
| 5,967,518 A | 10/1999 | Rowe |
| 5,971,397 A | 10/1999 | Miguel et al. |
| 5,979,898 A | 11/1999 | Pan |
| 5,988,646 A | 11/1999 | Fair |
| 6,053,499 A | 4/2000 | Yiu |
| 6,062,997 A | 5/2000 | Seymour |
| 6,076,021 A | 6/2000 | Houriet, Jr. et al. |
| 6,089,571 A | 7/2000 | Cho |
| 6,116,607 A | 9/2000 | Cho |
| 6,155,570 A | 12/2000 | Allison et al. |
| 6,215,390 B1 | 4/2001 | Lin |
| 6,279,912 B1 | 8/2001 | Martin et al. |
| 6,439,576 B1 | 8/2002 | Montague |
| 6,717,684 B1 | 4/2004 | Fikes et al. |
| 6,805,354 B2 | 10/2004 | Martin et al. |
| 6,837,495 B2 | 1/2005 | Gerson et al. |
| 6,917,282 B2 | 7/2005 | Giegerich |
| 6,923,447 B2 | 8/2005 | Lai |
| 6,974,133 B2 | 12/2005 | Martin et al. |
| 7,006,076 B2 | 2/2006 | Fougere |
| 7,163,204 B1 | 1/2007 | Liao |
| 7,175,182 B2 | 2/2007 | Pan et al. |
| 7,258,344 B2 | 8/2007 | Giegerich et al. |
| 7,316,399 B2 | 1/2008 | Shaw et al. |
| 7,578,508 B2 | 8/2009 | Caspi et al. |
| 7,624,988 B2 | 12/2009 | Shao |
| 7,806,409 B1 | 10/2010 | Cardenas |
| 7,857,317 B2 * | 12/2010 | Noda ................ F41J 5/00 273/372 |
| 7,866,668 B2 | 1/2011 | Huang |
| 7,905,488 B2 | 3/2011 | Fulgham |
| 7,985,125 B2 | 7/2011 | Kagami et al. |
| 8,113,930 B1 | 2/2012 | Coats |
| 8,162,731 B2 | 4/2012 | Noda et al. |
| 8,570,499 B2 * | 10/2013 | Walti-Herter ............ G01V 8/20 356/72 |
| 8,579,295 B2 | 11/2013 | Noda et al. |
| 8,622,794 B2 | 1/2014 | Hong |
| 8,740,222 B1 | 6/2014 | Krzewicki et al. |
| 8,764,016 B2 | 7/2014 | Stewart |
| 8,894,068 B2 | 11/2014 | Rice et al. |
| 8,979,092 B2 | 3/2015 | Kim |
| 10,066,908 B2 | 9/2018 | Hong |
| 10,443,987 B2 * | 10/2019 | Hollinger ................ G06T 7/13 |
| 2002/0109300 A1 | 8/2002 | Yiu |
| 2002/0135131 A1 | 9/2002 | Martin et al. |
| 2002/0171203 A1 | 11/2002 | Cho |
| 2003/0168811 A1 | 9/2003 | Gerson et al. |
| 2003/0214098 A1 | 11/2003 | Chang |
| 2004/0084846 A1 | 5/2004 | Tsai et al. |
| 2005/0006847 A1 | 1/2005 | Ross |
| 2005/0062232 A1 | 3/2005 | Pavlik et al. |
| 2005/0153786 A1 * | 7/2005 | Petrov ................ G01P 3/685 473/151 |
| 2006/0061039 A1 * | 3/2006 | Pan ................ F41J 5/02 273/371 |
| 2006/0066053 A1 | 3/2006 | Skala |

(56) References Cited

U.S. PATENT DOCUMENTS

| | | |
|---|---|---|
| 2006/0091603 A1 | 5/2006 | Froehlich |
| 2007/0228659 A1 | 10/2007 | Yiu |
| 2008/0012233 A1 | 1/2008 | Giegerich et al. |
| 2008/0088090 A1 | 4/2008 | Hand et al. |
| 2008/0185788 A1 | 8/2008 | Parton |
| 2009/0218769 A1 | 9/2009 | Krzewicki et al. |
| 2009/0295085 A1 | 12/2009 | Rauch |
| 2011/0031696 A1 | 2/2011 | Su et al. |
| 2011/0109045 A1 | 5/2011 | Su et al. |
| 2012/0083342 A1 | 5/2012 | Cross et al. |
| 2013/0065713 A1 | 3/2013 | Faecher |
| 2014/0151965 A1* | 6/2014 | Garas .................... F41J 5/06 273/371 |
| 2014/0265132 A1 | 9/2014 | Layne, IV |
| 2016/0138895 A1* | 5/2016 | Beine .................... F41J 5/044 434/19 |
| 2016/0370155 A1 | 12/2016 | Dale |
| 2017/0191805 A1 | 7/2017 | Teng et al. |

\* cited by examiner

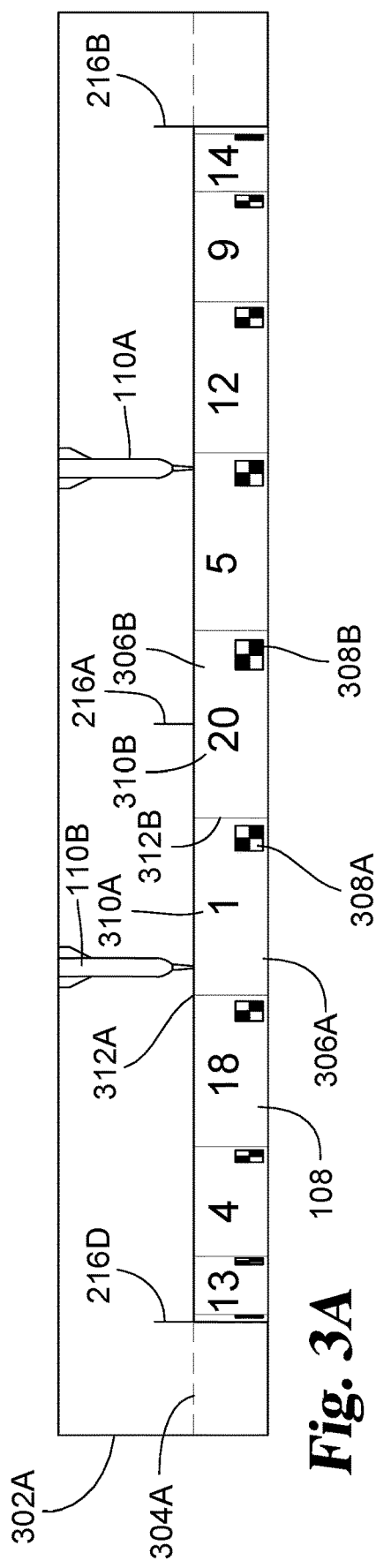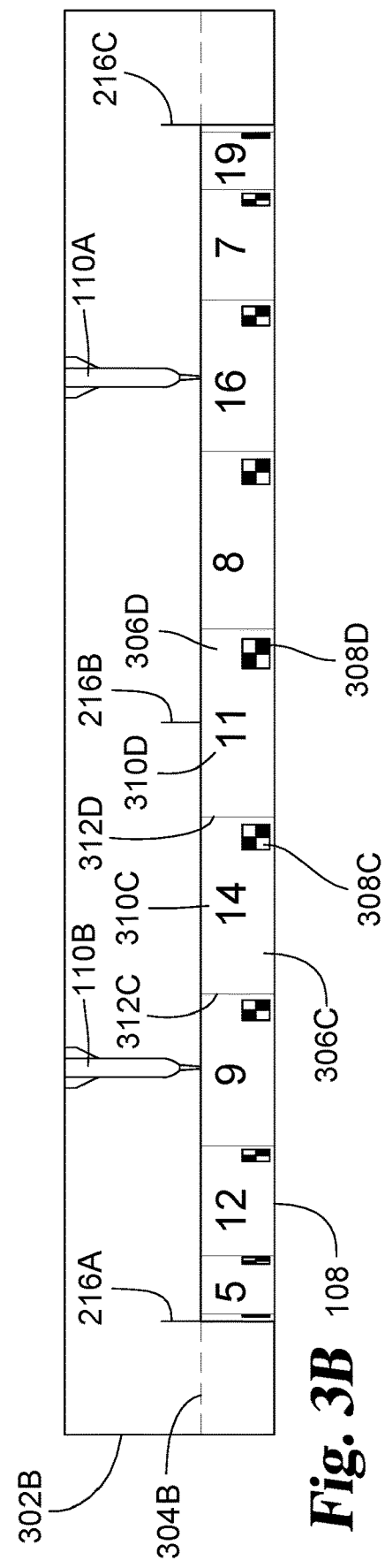

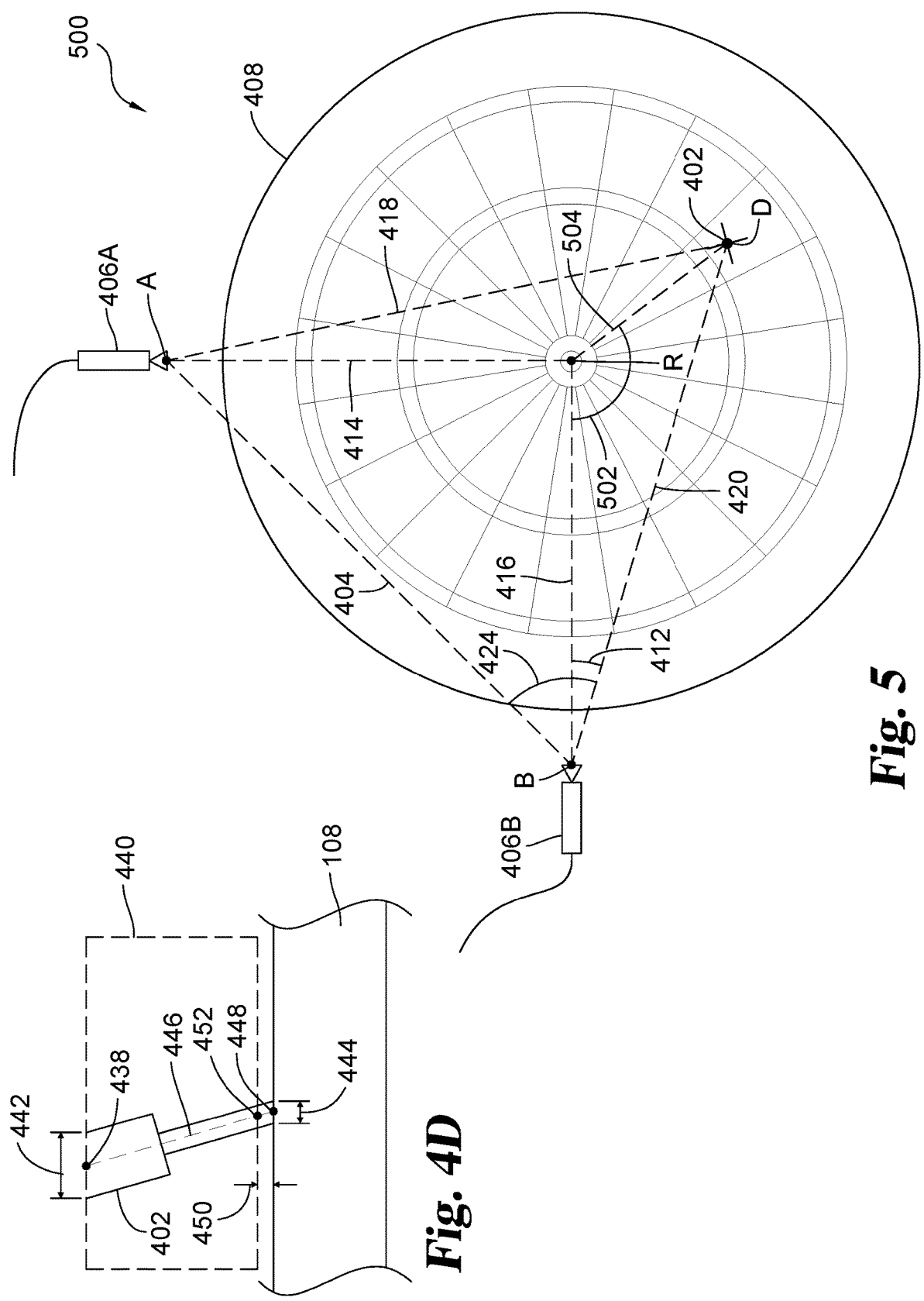

DARTBOARD SCORING SYSTEM

CROSS REFERENCE TO RELATED APPLICATIONS

This application is a continuation of U.S. patent application Ser. No. 15/493,337 filed Apr. 21, 2017, which claims the benefit of U.S. Provisional Application No. 62/325,500 filed Mar. 15, 2013, which are hereby incorporated by reference in its entirety.

BACKGROUND

The disclosure generally relates to a system for automatically scoring a game of darts. The game can traditionally be played with a board and a set of darts, and without any system for automatically scoring the match.

Some systems that can score a dart game have been proposed, but they are sometimes expensive, complex, or only partially automated. For example, some scoring systems only score the results and do not detect when or where a dart has landed. In these systems, users must input the location of darts as they are thrown. Other scoring systems may detect where darts have landed and calculate a score, but may involve complex arrays of sensors embedded in the board. Such boards may be prohibitively expensive and are sometimes inaccurate because of gaps in the coverage area of the sensors.

Some systems may also require specialized darts compatible with the sensors making them incompatible with traditional dartboards designed to use steel-tipped darts that penetrate into the board. Players may then need to throw a non-standard kind of dart requiring adjustments to their throw or style of play that may be unwelcome. For example, bristle dartboards that are compatible with some plastic-tipped darts may be required for some automatic scoring dartboards.

Traditional steel-tipped darts are often preferred by players, but automatically scoring them raises other challenges. Some systems attempt to score penetrating darts by using boards with exotic surfaces or multiple layers that may include special sensory membranes. The membrane may indicate the presence and location of the dart tip when the membrane is penetrated. However, over time, the membrane can lose sensitivity after it has been penetrated numerous times meaning it must be replaced, making the board less reusable than a standard board.

Some scoring systems rely on darts with specific devices or materials in the tip of the dart that are configured to trigger a sensor array in the board. Although these systems may provide increased accuracy and reusability, they generally require a board with the sensor array embedded into the board material. Standard steel-tipped darts generally do not include such devices or materials in the head of the dart. Additionally, specialized darts are often configured to adhere to the board surface rather than penetrating into it to avoid damaging the sensors. Thus systems for scoring steel-tipped darts often cannot take advantage of the increased accuracy and reusability provided by other types of boards.

Requiring special darts, exotic arrays of sensors, membranes, or specially constructed boards also limits the opportunity for existing board owners to upgrade their boards to include the benefits of automatic scoring systems. Restaurants, bars, recreational facilities, and private homes may thus be unable to retrofit their current dartboards with an automatic scoring system. They may then be left to choose between forgoing the benefits of automatic scoring, or accepting the additional cost and maintenance burden involved in purchasing and operating a separate automatically scored dartboard that may be incompatible with their current board.

As a result, many scoring systems are unsatisfying to use, cannot be fitted to an existing traditional dartboard, or are prohibitively expensive to manufacture and sell.

SUMMARY

The disclosed dartboard scoring system uses cameras positioned around the outside edge of a dartboard and may be used with any suitable darts such as traditional steel-tipped darts, plastic tipped, magnetic tipped, and others. The cameras are arranged to watch for and locate darts as they land on the board, and to automatically calculate a score based on the particular dart game being played. The system may, for example, accurately locate and score traditional steel-tipped darts used with a standard board with as few as two cameras. The cameras provide images of the darts to a game controller that can use the image data to calculate where the darts are on the board, and the resulting score based on points allotted to various regions of the board.

To detect the darts, the cameras can be positioned and configured with fields of view that are substantially parallel to the face of the board. In other words, the face of the board may not be visible to the cameras. In viewing the board from the side rather than the front, the board edge may define one side of the cameras' viewing area, and thus the side of the board may be just outside of the camera's field of view. From this perspective, the cameras can "see" darts projecting outwardly away from the surface of the board as they land.

Images acquired by the cameras are used by the game controller to compute the dart's position on the board. Various image processing algorithms may be used to make these calculations. For example, the system may detect a dart has been thrown by detecting differences in the frames or images captured by the cameras. The control logic may compare the latest frame or image captured by the camera to the background, or to the previous frame. The control logic may be programmed to identify shapes, colors, lines, or other elements of the image that are common to both images, or appear only in the most recent image. The controller may use this information to determine where the new shapes are relative to the board face, and calculate a score.

Calculating where the darts are on the board involves triangulating a dart's location on the board using images acquired from the cameras. As discussed above, the most recent image data can be used to find the center of the dart based on changes in the image data received by the camera. The control logic may calculate an initial angle for the dart indicating the number of degrees left or right of the center of the camera. Additional angles may be calculated and from them the distance to the dart from each camera, and from a reference point such as the "bulls eye" in the center of the board. An angle indicating the radial position of the dart relative to the reference point may be calculated (e.g. 90 degrees or about the "3 o'clock" position, or 270 degrees, or at about the "9 o'clock" position).

Positioning the cameras and calibrating the system may be an initial action taken when the system is installed or manufactured. The cameras may be configured to initially photograph the edge of the board which may include letters, numbers, bar codes, or other symbols indicating how the board is oriented relative to each camera. Each camera may automatically detect where it is relative to the center and the edges of the board, as well as relative to any scoring regions specific to the particular dart game being played. In other words, the scoring system may be configured to automatically calibrate itself when it is activated.

A controller included with the system may be configured to manage overall game play, initializing or calibrating the system, accepting input from a user, displaying output, calculating the location of darts, and the resulting scores. Buttons, displays, or other controls may be included and configured to allow users to perform various game related functions such as overriding scoring decisions, indicating when a dart missed the board altogether, starting a new game, or loading different types of games each with different rules. Different games may apply scoring regions to the game which vary from what may be commonly used in dart games. For example the board may be free of built in scoring regions allowing alternate board configurations to be projected onto the board from a projector controlled by the system.

The controller may also be configured to accept input from a user directly, or to interact with a remote control or a computer such as a tablet, laptop computer, smart phone, or desktop computer to control the flow of the game. The computer may also be configured to communicate with other dartboard systems for example other scoring systems or a tournament server thus allowing players to compete against each other when they are not in the same room throwing darts at the same board.

Further forms, objects, features, aspects, benefits, advantages, and embodiments of the present invention will become apparent from a detailed description and drawings provided herewith.

BRIEF DESCRIPTION OF THE DRAWINGS

FIGS. 3A and 3B are diagrams illustrating views of the board with an indexing system as seen by cameras in a scoring system like the scoring system of FIG. 1.

FIG. 4D is a diagram illustrating calculations that may be used for locating a dart in a scoring system like the system of FIG. 4A.

FIG. 5 is a second diagram illustrating additional calculations that may be made in a scoring system like the scoring system of FIG. 1.

DETAILED DESCRPTION

Figure 1:
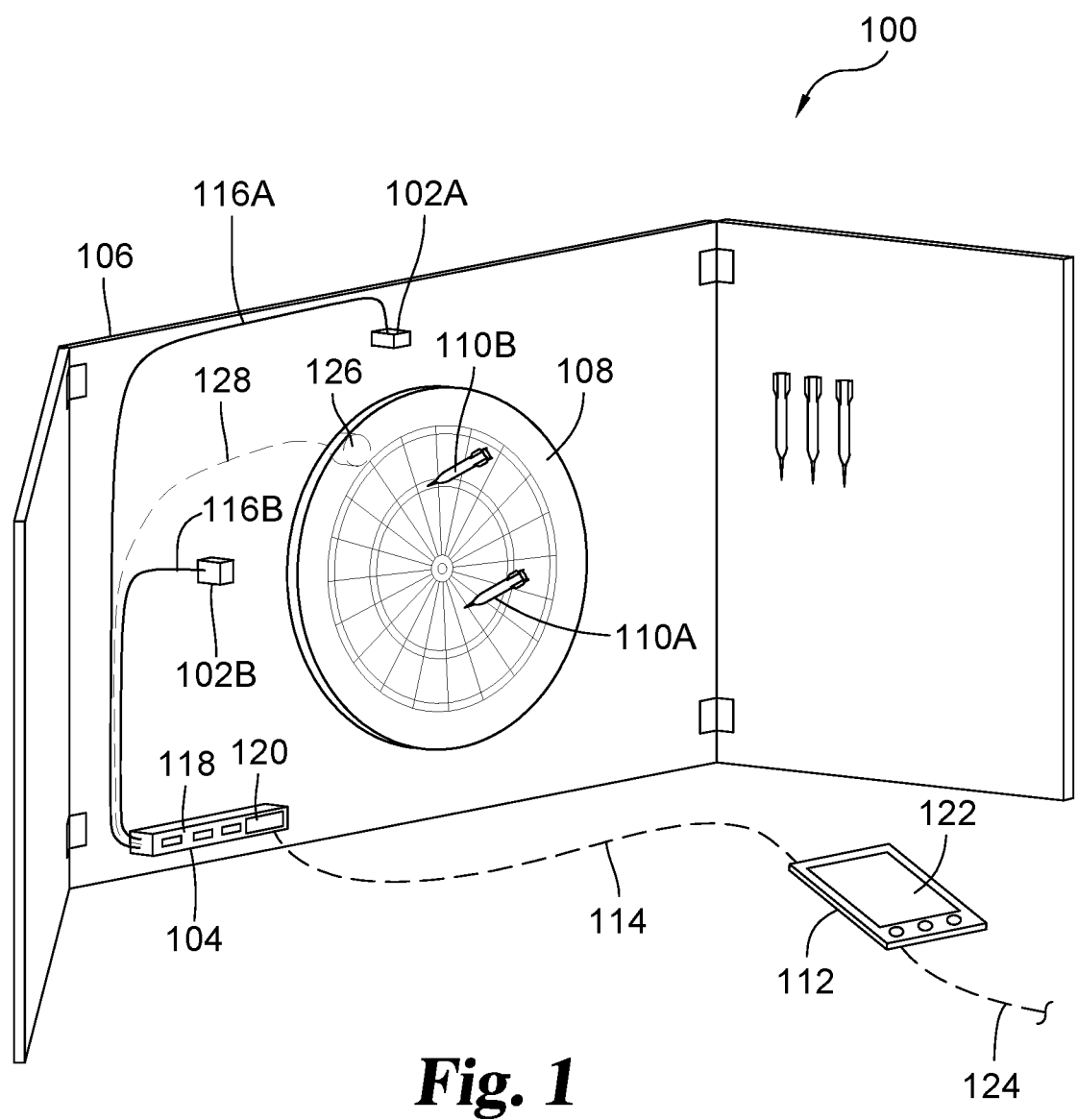
FIG. 1 is a diagram illustrating one example of the components of the disclosed scoring system.

With respect to the organization and description of figures, the reference numerals in the detailed description are organized to aid the reader in quickly identifying the drawings where various components are first shown. In particular, the drawing in which an element first appears is typically indicated by the left-most digit(s) in the corresponding reference number. For example, an element identified by a "100" series reference numeral will first appear in FIG. 1, an element identified by a "200" series reference numeral will first appear in FIG. 2, and so on.

Beginning with FIG. 1, one example of a dartboard scoring system is shown at 100. In this example, a dartboard 108 may be positioned in or mounted to a support structure such as an enclosure 106, examples of which include a cabinet or case. Cameras 102A and 102B may be mounted on, or adjacent to, dartboard 108. In this example, a pair of cameras 102A and 102B are positioned to define a viewing area that includes darts 110A and 110B extending outwardly from the plane or face of board 108. Positioned substantially parallel to the surface of the board, each camera's field of view may include little if any of the scoring surface or "face" of the dartboard itself. From this perspective, cameras 102A and 102B may be configured to "see" objects projecting from the board without directly viewing scoring regions defined on the surface thereof. Points scored by darts 110 may be calculated by controller 104 by calculating the relative position of darts 110 based on information received from cameras 102 via communications links 116A and 116B. These connections 116 may include physical wires, or may be wireless links.

A sensor 126 may be included, and may be mounted behind or adjacent to board 108 to aid in detecting when a dart is thrown. The sensor may detect a dart throw by any suitable means such as by detecting vibrations or sounds caused by darts 110 impacting board 108 when thrown. The controller 104 may be responsive to the resulting signals from sensor 126 which may be relayed to controller 104 via a communication link 128. Like communications links 116, links 128 may use wired, wireless, or may use any other suitable communications technology. Detection may be performed using controller 104 to compare signals from sensor 126 with other feedback such as visual information obtained from cameras 102.

Game play may be managed by a controller 104 which may be configured to receive input from players via input devices 118. Results of the game may appear on a display 120. In another example, the controller may interact with a computer 112 in communication with controller 104 via a wired or wireless communications link 114. Controller 104 may accept commands from computer 112 which may include software configured to generate a Graphical User Interface (GUI) displayed on a display device 122. The GUI may include graphical controls for managing the flow of a game or performing maintenance functions. For example, the GUI may be configured with controls for starting a new game, manually overriding the scoring as the game progresses, upgrading software in controller 104, or for providing controller 104 with the ability to communicate with other dartboard scoring systems in locations remote from system 100 using a wired or wireless connection to a computer network 124.

Scoring a dart game using a system according to the present disclosure involves orienting the board so as to allow the cameras to capture images of the darts as they land, and so as to allow control logic in the controller to accurately calculate the location of the darts and determine a score based on the arrangement of scoring regions on the board.

Figure 2:
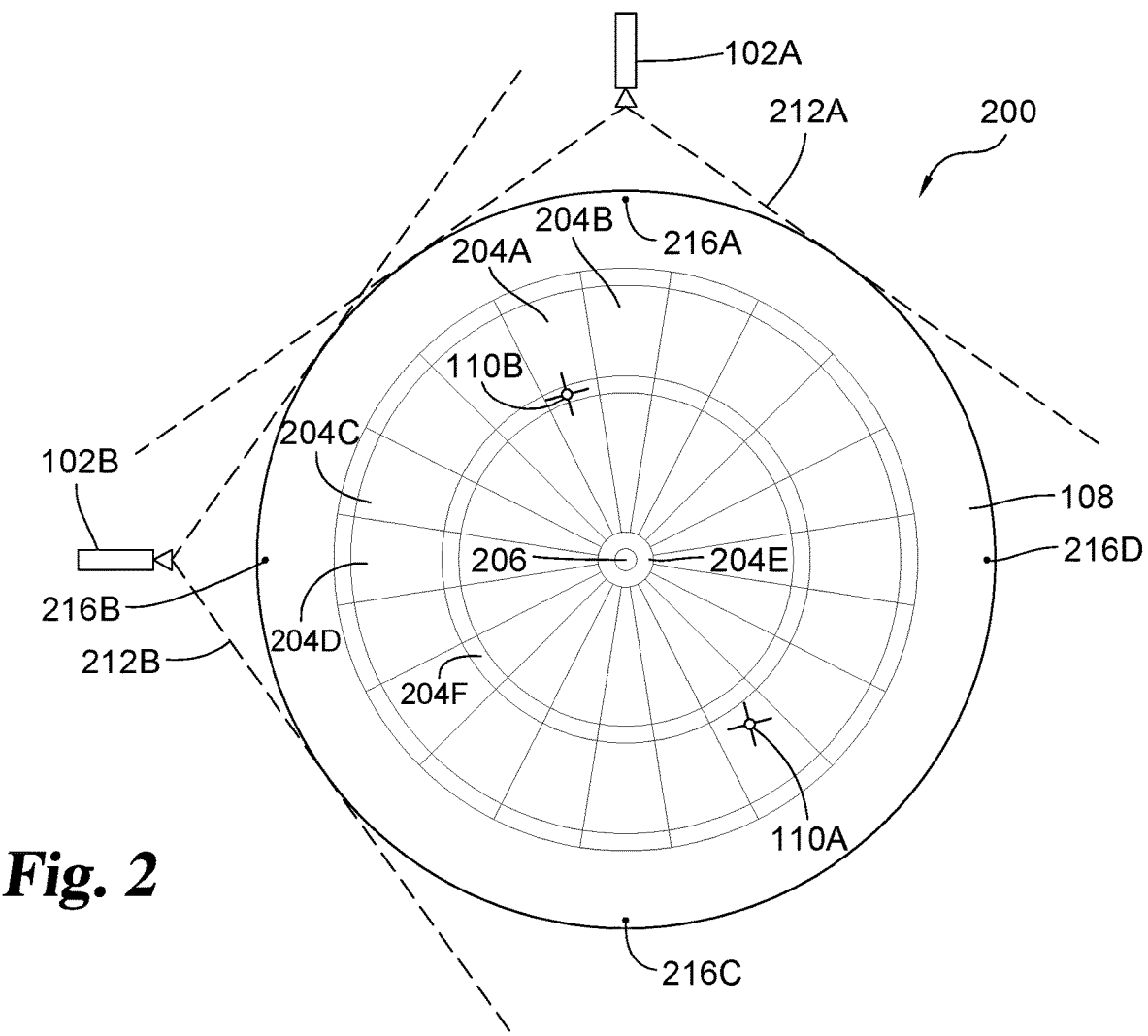
FIG. 2 is a diagram illustrating one arrangement of cameras in a scoring system like the scoring system of FIG. 1.

For example, as illustrated at 200 in FIG. 2, board 108 is arranged with cameras 102A and 102B similar to the arrangement appearing in FIG. 1. Board 108 is divided into scoring regions such as regions 204A-204F, and each separate region may be assigned a separate point value. When the system detects a dart such as darts 110A or 110B, it can calculate the position of the dart on board 108, and assigns the proper point value based on which region 204 the dart 110 is calculated to be in.

As an initial matter, cameras 102A and 102B are arranged with corresponding fields of view 212A and 212B which allow them to capture images of darts landing on board 108, and may include coverage for regions outside scoring regions 204. Fields of view 212 may also include areas off of board 108 which may assist in detecting darts that have missed board 108 altogether. Any suitable camera 102 that has a field of view 212 sufficient to capture images of darts landing on board 108 may be used. Cameras with narrow or wider fields of view may be more or less desirable depending on the number of cameras 102 and their arrangement substantially parallel to the face of the board. An individual camera's viewing area is defined by the arrangement of internal optical elements lenses, sensors, and the like in each camera.

Thus the orientation and position of regions 204 relative to cameras 102 allows the system to detect and score darts 110 as they land. Regions 204 may be arranged on board 108 in any configuration suitable to the game being played. As illustrated at 200, board 108 may be configured with scoring regions 204 which are defined by boundaries extending radially from a reference point 206, which in this case may be in the scoring region 204E sometimes referred to as the "bull's-eye". In another example, region 204F is defined by boundary lines extending annularly around reference point 206. In yet another example, the regions may be defined as a grid pattern, or by various sized or shaped polygons such as squares, hexagons, circles, rectangles, irregularly shaped polygons, and the like. The regions may be more irregularly shaped objects such as animals or ships with varying target zones and may be printed and/or projected onto the board. The region sizes or scoring values associated with them may also change programmatically depending on a present skill level. For example the system may be set into an "expert" mode so that when the game is initialized, certain regions or scoring zones within a region may actually be less than 50%, less than 25%, or less than 5% of the area actually printed on the board thus requiring additional accuracy when throwing the darts. Where the board scoring regions are projected onto the board, setting an "expert" or other mode may decrease the area of each scoring region projected onto the board accordingly, or the size of a scoring region might increase if the difficulty level is reduced such as in a "novice" mode.

The regions may be defined by material such as metal banding that extends outwardly from the surface of board 108. In other cases, the regions may be defined by lines printed on the surface of board 108. In yet another example, regions 204 may be defined by an image projected onto board 108 such as by a projector. The image may change over time such as by rotating, moving around the board, or by changing the arrangement of scoring regions while the game is in progress. Board 108 may be any suitable shape such as a circle, square, irregular polygon, and the like. In any case, the disclosed system is aware of the boundaries defined by the separate scoring regions 204.

The system may be made aware of the arrangement of scoring regions 204 by any suitable means. For example, the board may be oriented so that the viewing areas of each camera are positioned to correspond with particular regions of the board. In this example, the position, size, and arrangement of scoring regions 204 may be known to the system because board 108 is a specific size and shape, and is oriented to correspond with cameras 102 when the system is installed or is manufactured along with the board. The controller may be programmed with a database of scoring rules and control logic corresponding to the specific orientation of board 108, and the various games that may be played.

Cameras like cameras 102 may define a field-of-view like the one illustrated in FIGS. 3A and 3B at 304. FIG. 3A illustrates a field-of-view from the camera positioned like camera 102A, while FIG. 3B illustrates a different field-of-view from a separate camera positioned like camera 102B. In both FIGS. 3A and 3B, field-of-view 304 may be captured by cameras that are mounted flush with the surface of board 108. Such a field-of-view is thus configured to capture image data depicting the position of darts 110 and may exclude image data showing the sides or edges of board 108.

In another example also illustrated in FIGS. 3A and 3B, board 108 may include indicia, markings, or other information that is automatically readable by the game control system. These markings or indicia may be used by the controller each time the system is initialized or reset to orient or calibrate the scoring system to match the precise position of board 108 as seen from the cameras 102.

An example of this calibration feature is illustrated in FIGS. 3A and 3B where a camera field-of-view 302A corresponds to the field-of-view visible from cameras like cameras 102. Field-of-view 302A includes a view of edge portions or edge faces 306 along the sides of board 108 face the camera. The illustrated edge portions correspond to the position of scoring regions on the face of board 108. Thus scoring regions like regions 204 may define corresponding edge portions 306. The system control logic may be configured to adjust its calculations according to the position of edge portions 306 each time a game is started avoiding errors in scoring that may result from board 108 being incorrectly positioned relative to cameras 102, or that may result from the irregularities that may appear over time in the images captured by cameras 102.

An edge portion 306 may be identified by any suitable means such as indicia 310, or by a machine recognizable pattern such as a barcodes 308. The system may be configured to process images of edge portions 306 to calculate the position of the cameras relative to board 108. For example, control logic may be included to optically recognize characters which may be included with indicia 310. In another example, the system control logic may be configured to decode barcode 308 using images of barcodes 308 captured from the cameras field-of-view. Other positional markings may include region boundaries 312 appearing on the edge portions of the board which correspond with boundaries defining scoring regions 204 on the face of the board. The position of indicia 310, barcode 308, region boundaries 312, other identifying information, or any combination thereof, relative to the cameras field-of-view, may be used by the control logic to calculate the relative position of board 108 and scoring regions 204.

Calibrating and orienting cameras 102 may include other aspects. For example, besides orienting cameras 102 to capture images parallel to the face of board 108, it may be advantageous to arrange board 108 so that one or more reference points board 108 are in predetermined locations at specific distances from cameras 102. For example, the distance from the reference point 206 to each camera's focal point may be the same for each camera. (Shown in FIG. 1). In another example, the field of view 212A and 212B (also illustrated as 302 or 304) may be centered at the bullseye, and may include a view of any objects in any scoring regions 204. In another example, a pair of cameras are positioned about 90 degrees apart with respect to the center of the bullseye, and cameras 102 are focused to have equal sharpness for darts located in the closest and farthest distances from the camera within the scoring area.

Calibrating cameras 102 may also include correcting for distortion caused by the configuration of lenses, sensors, or other internal components specific to an individual camera. This calibration may be necessary in order to accurately calculate angle, distance, or other positional information relative to board 108 using image data captured by a camera 102. One method of accomplishing this is to capture an image of a measuring device (e.g. a meter stick) using cameras 102. Markings on the measuring device that have a known spatial relationship to one another (e.g. millimeter lines) may be detected by the control logic and mapped to specific rows of pixels in the image. One example of this conversion includes the following formula:

$$\text{Angular Offset} = \tan^{-1} \frac{\text{Spatial Offset}}{\text{Reference Distance}} \quad \text{Formula 1}$$

Where:
Angular Offset=The resulting angular offset
Spatial Offset=The corresponding spatial marking on the measuring device (e.g. specific millimeter marking on a meter stick)
Reference Distance=The predetermined distance from the camera to a fixed reference point on the board (e.g. the distance to the bullseye)

The relationship between angular offsets and corresponding rows of pixels in the captured images based on predetermined distances may be stored in lookup tables or used to create curve fitting calculations. These lookup tables or curve-fitting algorithms may be useful for correcting errors in calculations resulting from distortion that is common to camera lenses, or for errors caused by particular irregularities in the components in a specific camera or camera lens.

Calibration and orientation of the board with respect to the cameras may also be enhanced or implemented by placing edge markers 216A-216D at points around the perimeter of the board. Such markers may be used as indexes in an indexing system whereby the control software and/or hardware can properly determine the position of darts with respect to scoring regions on the board. Markers 216, as illustrated, include four separate markers positioned at specific locations around board 108. Markers 216 may be placed by inserting marking objects into the board at specific predetermined locations, the marking objects being one example of indexes for calibrating the scoring algorithms. In another example, a fifth marker may be temporarily or permanently placed at reference point 206. Such objects may then be removed when calibration is complete such as during the final stages of the manufacturing process. In another example, a dart tip, or other stylus may be placed at various locations around the board during calibration thus indicating to the system the position and orientation of predetermined locations around the surface of the board.

In another example, markers 216 may be placed permanently in specific locations with respect to the board making them available to the calibration algorithms in the system control logic each time the scoring system is activated. Permanent placement may be achieved by etching or printing the index marks on the mounting frame or cabinet that board 108 is positioned within or adjacent to. These index markings may then always be visible and useable by the cameras for calibration whenever the system is activated.

Figure 3C:
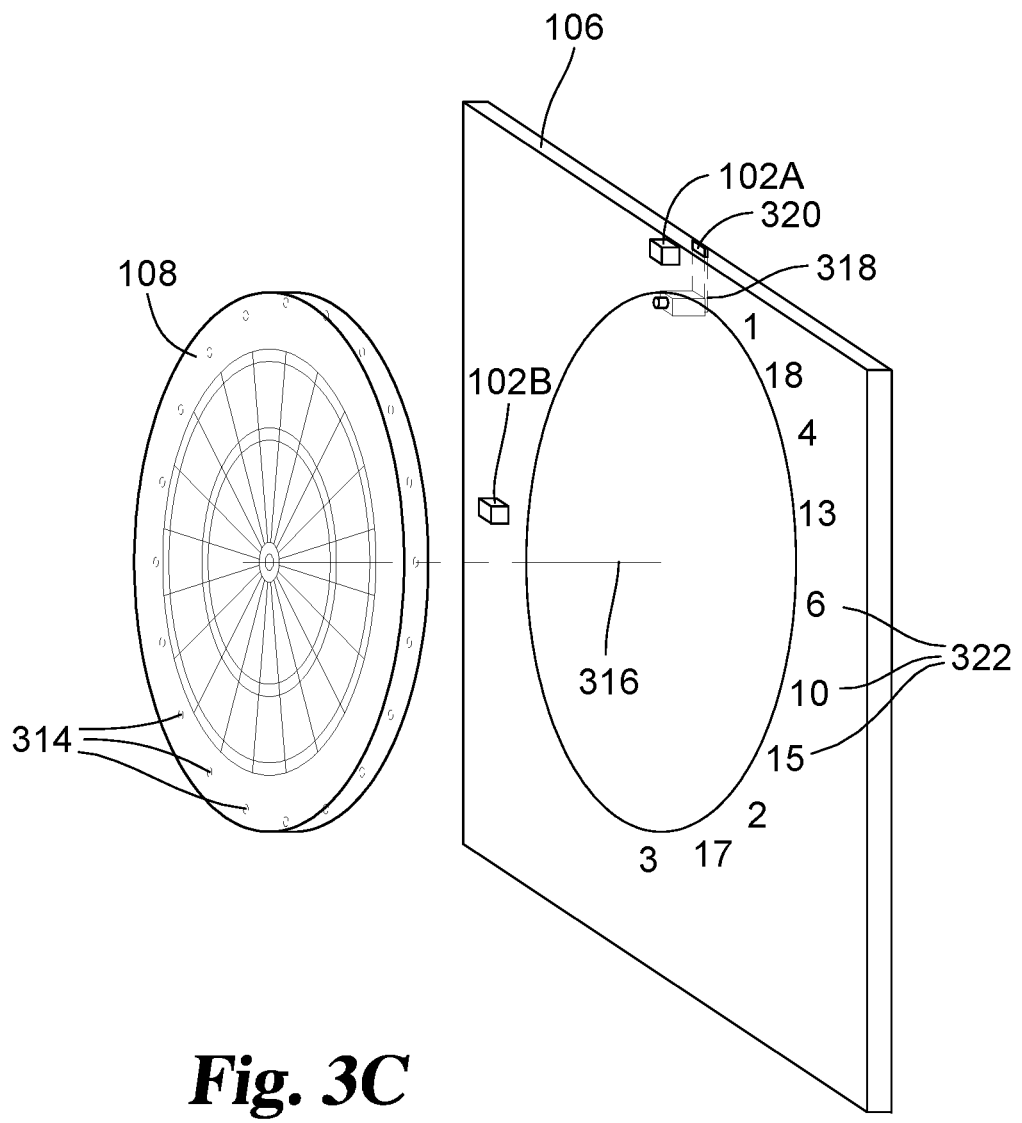
FIGS. 3C-3E are diagrams illustrating examples of different indexing systems that might be used in a scoring system like the system of FIG. 1.

In another example illustrated in FIG. 3C, indexes 314 are positioned around a back side of board 108 (i.e. the side opposite the scoring surface). In this example, indexes 314 are detents, impressions, protrusions, or holes in board 108 extend at least partially into the board if not passing through it entirely. An indexer 318, such as a peg extending outwardly from enclosure 106 may be arranged to correspond with indexes 314, and may include a biasing element and a release mechanism 320. The biasing element may be configured to maintain indexer 318 in one of indexes 314 until release mechanism is actuated causing indexer 318 to withdraw away from board 108 allowing board 108 to rotate around axis 316. In this way, board 108 may be rotated independently of scoring indicia 322 allowing users to rotate the board without adversely affecting the scoring process as described herein. Any suitable number or configuration of indexes 314 may be used. For example, as shown in FIG. 3C, 20 indexes 314 are used and are positioned to correspond to the scoring segments on a standard dartboard.

Figure 3D:
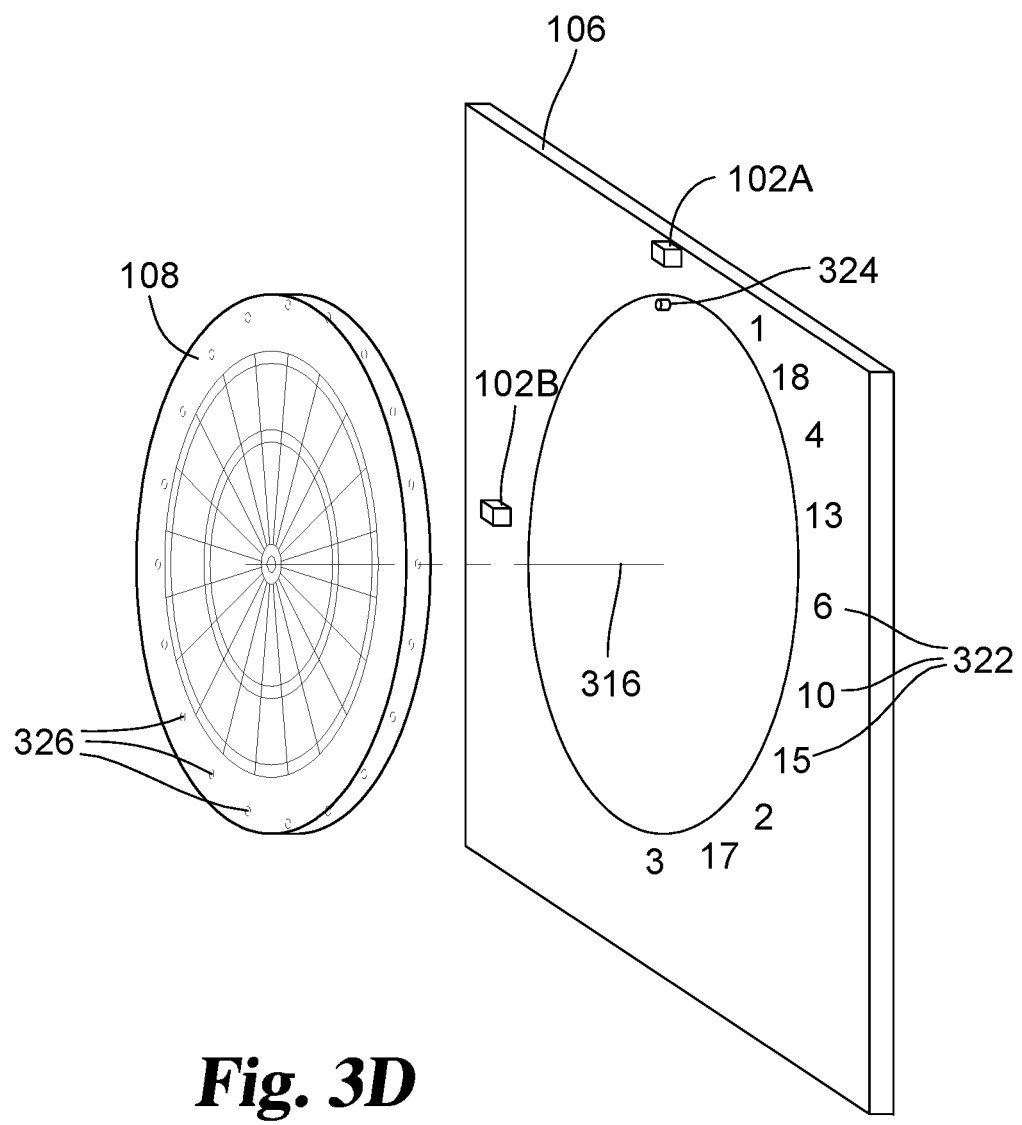

FIG. 3D illustrates another example indexing system. In FIG. 3D indexes 326 are positioned around a back side of board 108 like indexes 314 in FIG. 3C. In this example, indexes 326 may include a ferromagnetic material, while indexer 324 may be a magnet. In another optional variation, indexes 326 may include magnets, and indexer 324 may include a ferromagnetic material. Ore, indexes 326 and indexer 324 may both be magnets configured with opposite poles facing one another to create an attraction between the two. In any of these cases, board 108 can be maintained in a proper spatial relationship to cameras 102 as indexes 326 are maintained in the correct relationship to indexer 324 by means of magnetic forces.

Board 108 may here also be rotated on axis 316 by applying torque to board 108 around axis 316 sufficient to overcome the magnetic attraction between magnet 324 and index 326. Board 108 may rotate independently of scoring indicia 322 allowing users to rotate the board without adversely affecting the automatic scoring process. Any suitable number or configuration of indexes 326 may be used.

Figure 3E:
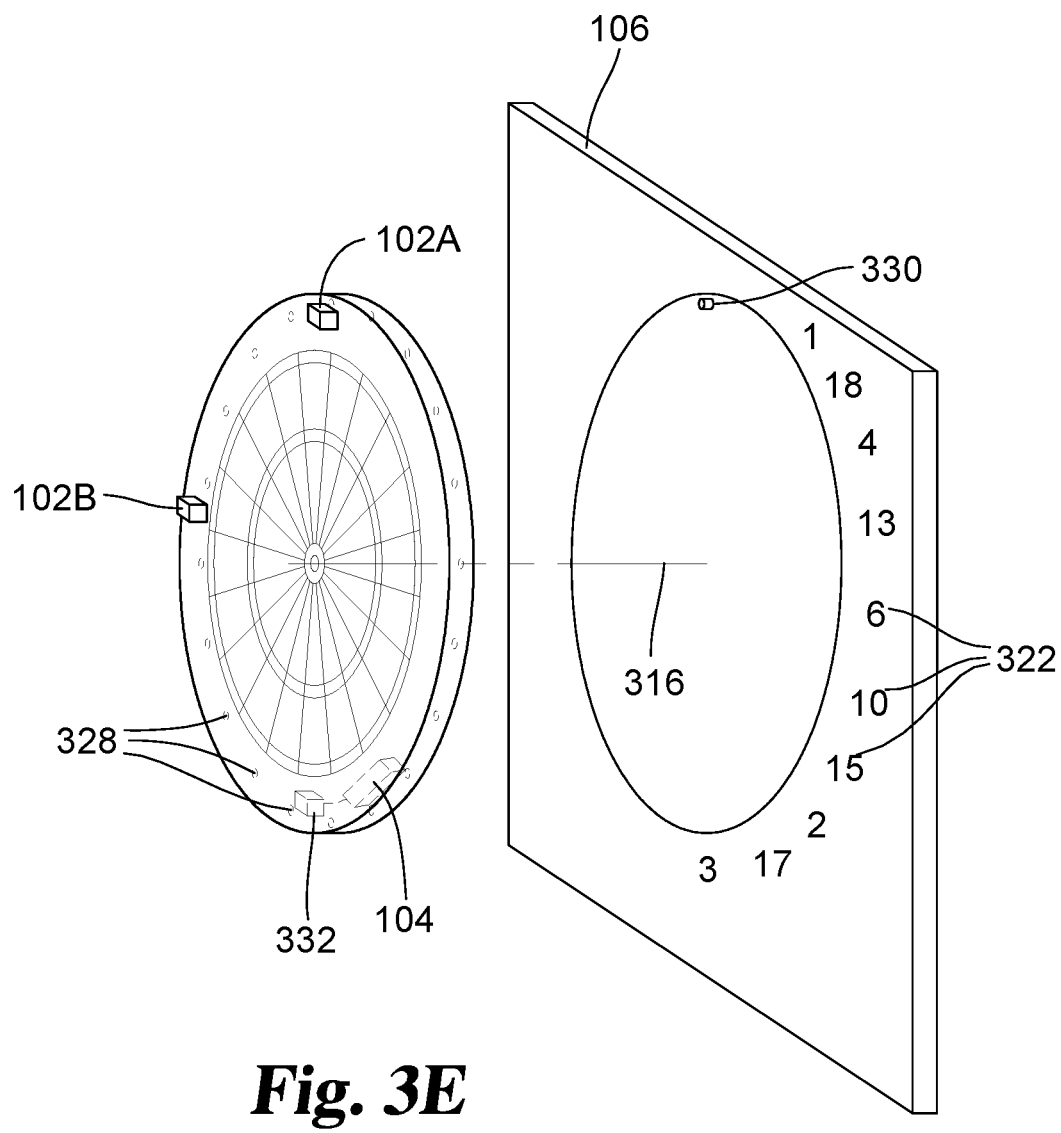

In another example shown in FIG. 3E, indexing of dartboard 108 is achieved by using a sensor 332, such as an accelerometer, that is operable to determine a change in the position of the board around axis 316 with respect to gravity. In this example, cameras 102, controller 104, and/or other components of the system can rotate around axis 316 while fixed to board 108. This allows components of the automatic scoring system to remaining in a fixed position relative to board 108.

The indexing system in FIG. 3E may also include indexes 328 and an indexer 330. For example, indexes 328 may operate like either of indexes 314 or 326 as discussed above, or they may be any other suitable indexing device. Indexes 328 are optional, and may be unnecessary such as where indexer 330 is a set screw, brake, or other device configured to interact with board 108 to keep it from rotating around axis 316.

Figure 4A:
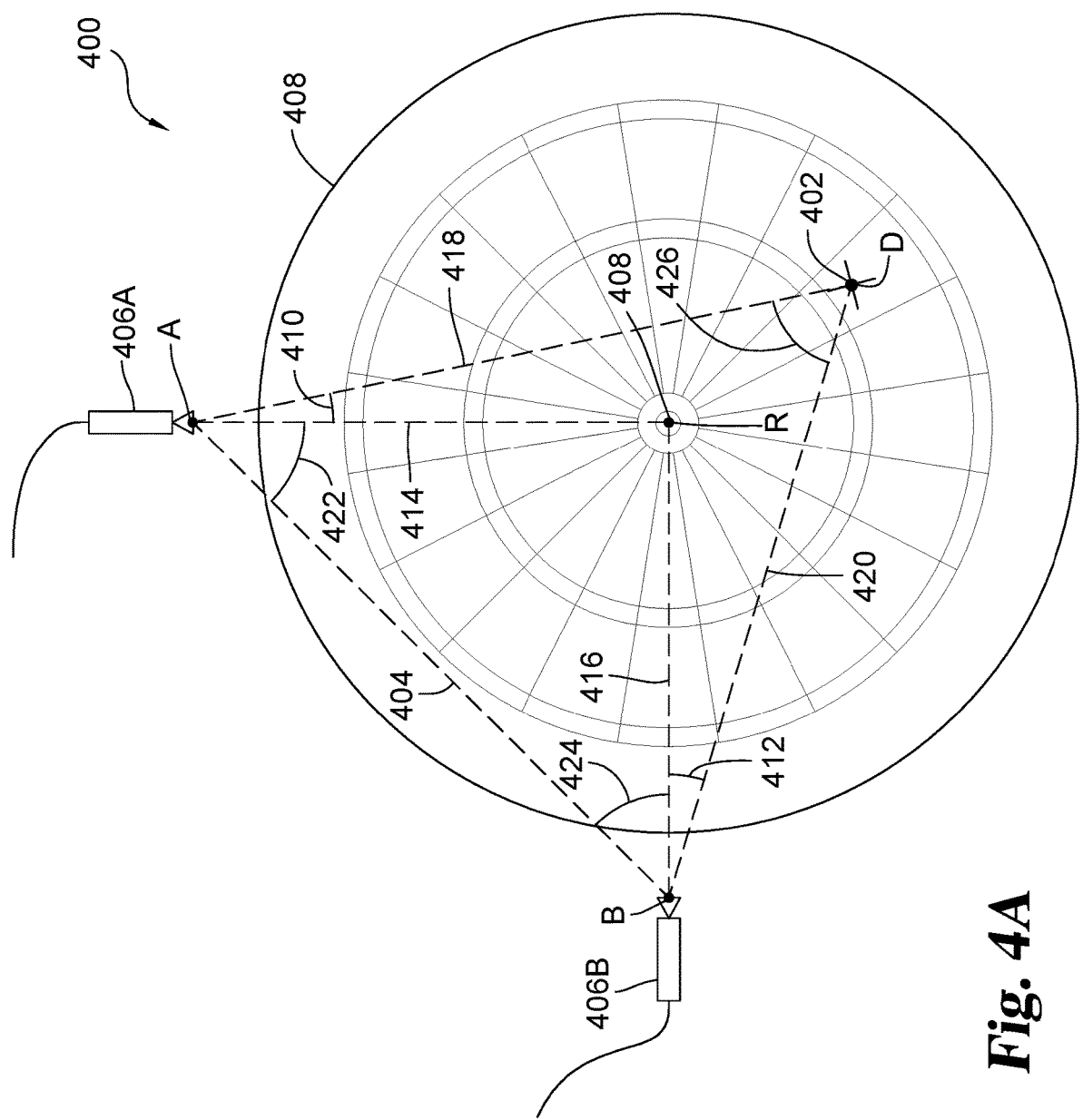
FIG. 4A is a diagram illustrating calculations that may be made in a scoring system like the scoring system of FIG. 1.

To determine the location of a dart on a dartboard using the disclosed system, the system may make a number of calculations. One example of these calculations is illustrated in FIGS. 4A and 5. Although the calculations involved may be useful for locating and scoring any number of darts, one dart 402 is illustrated in FIGS. 4A and 5 to simplify the explanation. (The position of dart 402 generally corresponds to the position of dart 110B appearing in FIGS. 1-3.) In this example, cameras 406A and 406B are like cameras 102 and are configured to capture pixel image data of dart 402 in one or more separate images taken from each camera.

The quality of pixel image data depicting the position of dart 402 may be enhanced by saturating the background as seen by cameras 406 (or 102) so that the darts appear darker than the background (e.g. the dart is silhouetted against the background from the point of view of the camera). This configuration can produce a high-contrast and/or monochromatic image while possibly reducing or eliminating specular highlights. This can simplify edge detection for the darts which may be advantageous, such as when multiple darts are clustered tightly together on the board. Similarly, controlled lighting for the areas visible to cameras in the disclosed system may reduce or eliminate variations (i.e. "noise") in the image data due to environmental ambient light.

Figure 4B:
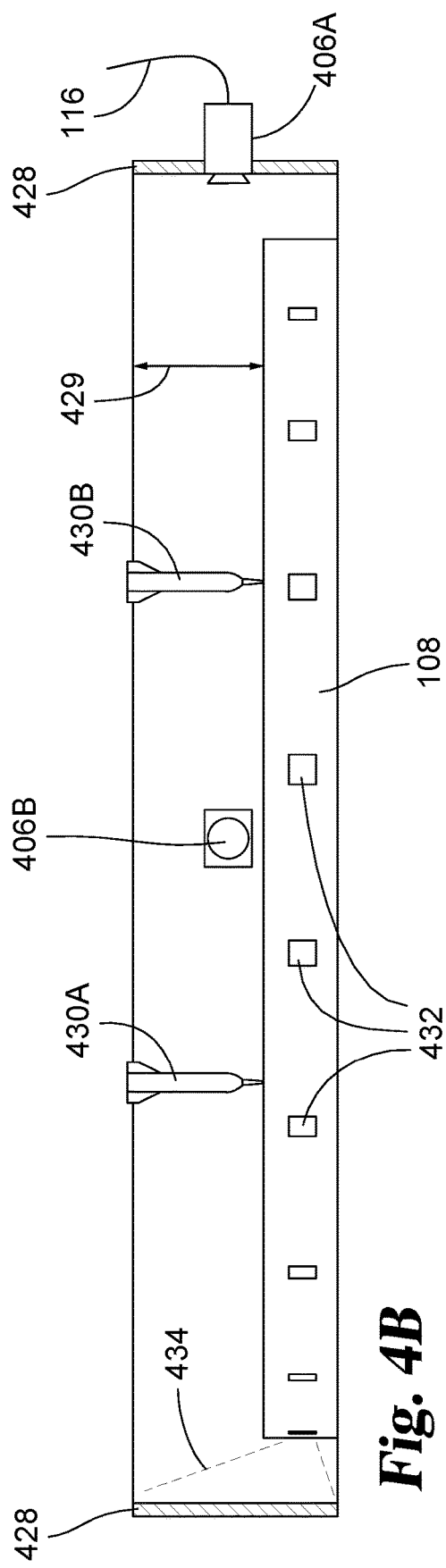
FIG. 4B is a diagram illustrating a lighting system for a scoring system like the system of FIG. 4A.

For example, as illustrated in FIG. 4B, lights 432 may be positioned to directly project light 434 onto a screen 428 that defines a height above the scoring surface 429. Lights 432 may be positioned in any suitable position, such as on the edge of board 108. The height 429 of screen 428 may be any suitable height sufficient to allow light 434 to adequately backlight darts 430. Cameras 406 may be mounted as illustrated so that the camera's field of view includes a surface of the lighted screen 428 on a side of the board opposite the camera. In this arrangement, the lights 432 project onto the same side of screen 428 that is visible to the cameras 406. Any suitable lights 432 may be used, and need not project visible light. For example, lights 432 may be infrared Light Emitting Diodes (LEDs) projecting light with a target wavelength of about 850 nm onto a plastic screen 428. Cameras 406 may be configured to capture pixel data in a corresponding narrow range of wavelengths that includes 850 nm. Such a narrow range may deviate from the target wavelength by less than 50 nm, less than 250 nm, or less than 500 nm, or more.

Figure 4C:
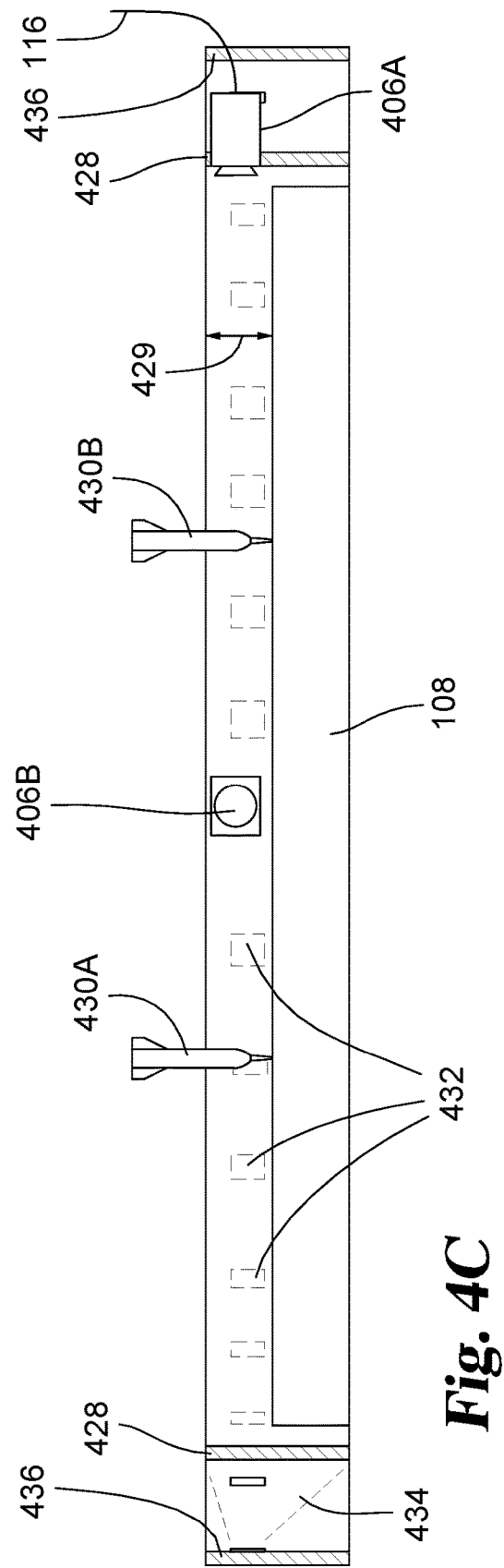
FIG. 4C is a diagram illustrating another example of a lighting system for a scoring system like the system of FIG. 4A.

In a second example show in FIG. 4C, lights 432 are mounted to a mount 436 which may be separate from screen 428. In this example, lights 432 project onto a first side of screen 428 that is opposite a second side that is visible to cameras 406. In this example, screen 428 may have a height 429 that is lower than what is shown in FIG. 4B. By backlighting screen 428 in the manner illustrated, light 434 may not reflect directly off the surface of screen 428 and then off of darts 430 reducing or eliminating specular highlights and/or edge blurring in the image data captured by cameras 430.

For the purposes of describing the calculations in the example provided, camera 406A is located at position A, and camera 406B is at position B. Dart 402 appears at D, and the reference point 408 (which is like reference point 206), is located at R. The center of each camera's field of view is illustrated as a line 414 extending from camera 406A to reference point 408, and similarly at 416 as a line extending from camera 406B to reference point 408. In the illustrated examples shown in FIGS. 4A and 5, lines 416 and 414 are substantially perpendicular to one another, and cameras 406 are each positioned substantially the same distance away from reference point 408 to simplify the calculations. However, such an arrangement may not be required in other examples that use different numbers of cameras or different boards with different configurations of scoring regions.

The following calculations may therefore be performed separately for each image captured from each camera. The controller may be configured to perform these calculations for images received from each camera in series (one after the other for each camera) or in parallel (for all cameras at about the same time). In some cases, the system may make calculations based on only one of the camera images.

In this example, the system logic is configured to calculate the scoring region dart 402 is in by determining the distance from a reference point on the board to the dart, and an angular offset for the dart relative to the reference point. For example, FIGS. 4A and 5 illustrate scoring regions found on many dartboards. The number of points initially awarded for dart 402 in this example is determined by the angular offset 502 shown in FIG. 5 (2 points in the case of dart 402). The distance from reference point 408 (504) allows the system to determine whether the points initially awarded will be doubled, tripled, or left as is (left as is in this example). As illustrated, dart 402 thus receives only 2 points. Other methods of determining the score for a dart are envisioned and may vary depending on factors such as the arrangement and shape of the scoring regions, the number and positioning of the cameras, and the like.

To determine the offset 502 and distance 504 illustrated in FIG. 5, the control software may initially calculate a center pixel, or row of pixels, corresponding to the tip of dart 402. This calculation may be performed by detecting the edges of the dart in the corresponding image captured by the camera. This kind of edge detection may be performed by any suitable image processing algorithm. The system software may be configured to use the center pixel as input into the map or curve fitting formula created using Formula 1 disclosed above.

One example of determining the center pixel from the image data is illustrated in FIG. 4D. Pixel data for an image captured by a camera such as cameras 102 and/or 420 shown in clipping region 440 which represents the portion of the image data the algorithm is considering. The field of view for a camera may be offset from the scoring surface by an offset 450. Such a configuration may involve calculating a projected vector 446 of the dart tip to calculate where the dart intersects the board. The system can calculate vector 446 by calculating a width 442 of a top edge of the dart where it intersects one side of view 440, and a second width 444 of a bottom edge where the dart intersects a second side of the field of view 440. Vector 446 can be calculated by locating the center of the bottom edge (point 452) and the center of the top edge (438) and calculating the line (or vector) 446 which projects down to the surface of the dartboard at 448. The point 448 may be used as the center pixel for determining the dart's location as referenced by the positioning algorithm.

Thus pixel data of dart 402 captured by camera 406A may be used to calculate an angle 410. Angle 410, which may also be referred to as ∠RAD, represents an angular offset of dart 402 with respect to the center of camera 406A's viewing area (line 414). A corresponding angular offset 412 may be calculated for camera 406B, and may be referred to as ∠RBD.

With these angles in mind, camera 406A, camera 406B, and dart 402 may be thought of as defining the vertices of a triangle with a first side 404 (side AB) defined by the distance between cameras 406A and 406B, a second side 418 (side AD) defined by the distance between camera 406A and dart 402, and a third side 420 (side BD) defined by the distance between camera 406B and dart 402. The length of side 404 is determined by the distances from cameras 406 to the reference point 408, and may be known or fixed. In FIGS. 4A and 5, 414 and 416 are equal and perpendicular to one another. This means angle 422, also referred to as ∠BAR, and angle 424 (or ∠ABR) are also 45 degrees.

In a different example where the distances between cameras 406A and 406B and reference point 408 are not equal, additional calculations and measurements may be useful to determine the lengths of the sides of a triangle defined by 414, 416, and 404, and the corresponding interior angles ∠BAR, ∠ABR, and ∠ARB. In that case, these angles and distances may be measured and/or calculated and stored as reference data in the control system, or automatically calculated by the system as part of the initial calibration process before the system calculates the distance to, and position of, dart 402 relative to the cameras 406.

In either case, calculating the interior angles of the triangle defined by sides 418, 404, and 420 is one way the system can determine offset 502 and distance 504. In FIGS. 4A and 5, angle ∠BAD may be calculated by combining angles 410 and 422. Similarly, ∠ABD may be calculated by adding angles 412 and 424. Angle ∠ADB (426) may be calculated by subtracting angles ∠ABD and ∠BAD from 180 degrees.

The length of sides 420 and 418, that is the distance from each camera to dart 402, can be calculated using angle 426, and distance between cameras 406. For example, the system can calculate the length of side 420 using the Law of Sines and the length of side 404 using the following formula:

$$BD = AB\left(\frac{\sin\angle BAD}{\sin\angle ADB}\right) \quad \text{Formula 2}$$

Where:
BD=The distance from the camera 406B to the dart (i.e. the length of side 420).
AB=The distance between the cameras 406A and 406B (i.e. the length of side 404).
∠BAD=The angle between camera 406B and dart 402 as viewed from camera 406A.
∠ADB=The angle between camera 406A and 406B as viewed from camera dart 402.

A similar calculation may be performed to calculate the length of 418 (i.e. the distance from the dart to camera 406A to the dart) by replacing BD with AD, and replacing ∠BAD with ∠ABD in Formula 2.

The system may be configured to calculate the distance from the reference point 408 to the dart (504), and the angular offset (502) of the dart as illustrated in FIG. 5 at 500. The distance 502 may be determined using the Law of Cosines as illustrated in the following formula:

$$RD = \sqrt{BD^2 + BR^2 - 2(BD)(BR)\cos\angle RBD} \quad \text{Formula 3}$$

Where:

RD=The distance from the reference point 408 to the dart 402 (i.e. side 504).
BD=The distance from dart 402 to camera 406B (i.e. side 420).
BR=The distance from the camera 406B to the reference point 408 (i.e. side 416).
∠RBD=The angle 412 between the center of the camera 406B's field of view (416) and dart 402.

The angular offset of the dart with respect to one of the cameras as illustrated may be calculated according to the following formula:

$$\angle DRB = \sin^{-1}\left(BD \times \frac{\sin\angle RBD}{RD}\right) \quad \text{Formula 4}$$

Where:
∠DRB=The angular offset of the dart with respect to the center of the field of view for camera 406B
BD=The distance from dart 402 to camera 406B (i.e. side 420).
∠RBD=The angle 412 between the center of the camera 406B's field of view (416) and dart 402.
RD=The distance from reference point 408 to the dart 402 (i.e. side 504).

When ∠DRB and side 504 are known, the system can score dart 402 using ∠DRB (502) to determine the base score (e.g. 2 points for a traditional dartboard), and the length of side 504, that is the distance from dart 402 to central region 408, can be used to determine if the base score is to be multiplied by a factor of one, two, or three (a factor of one as illustrated), or is out of bounds receiving a score of zero points.

Figure 6:
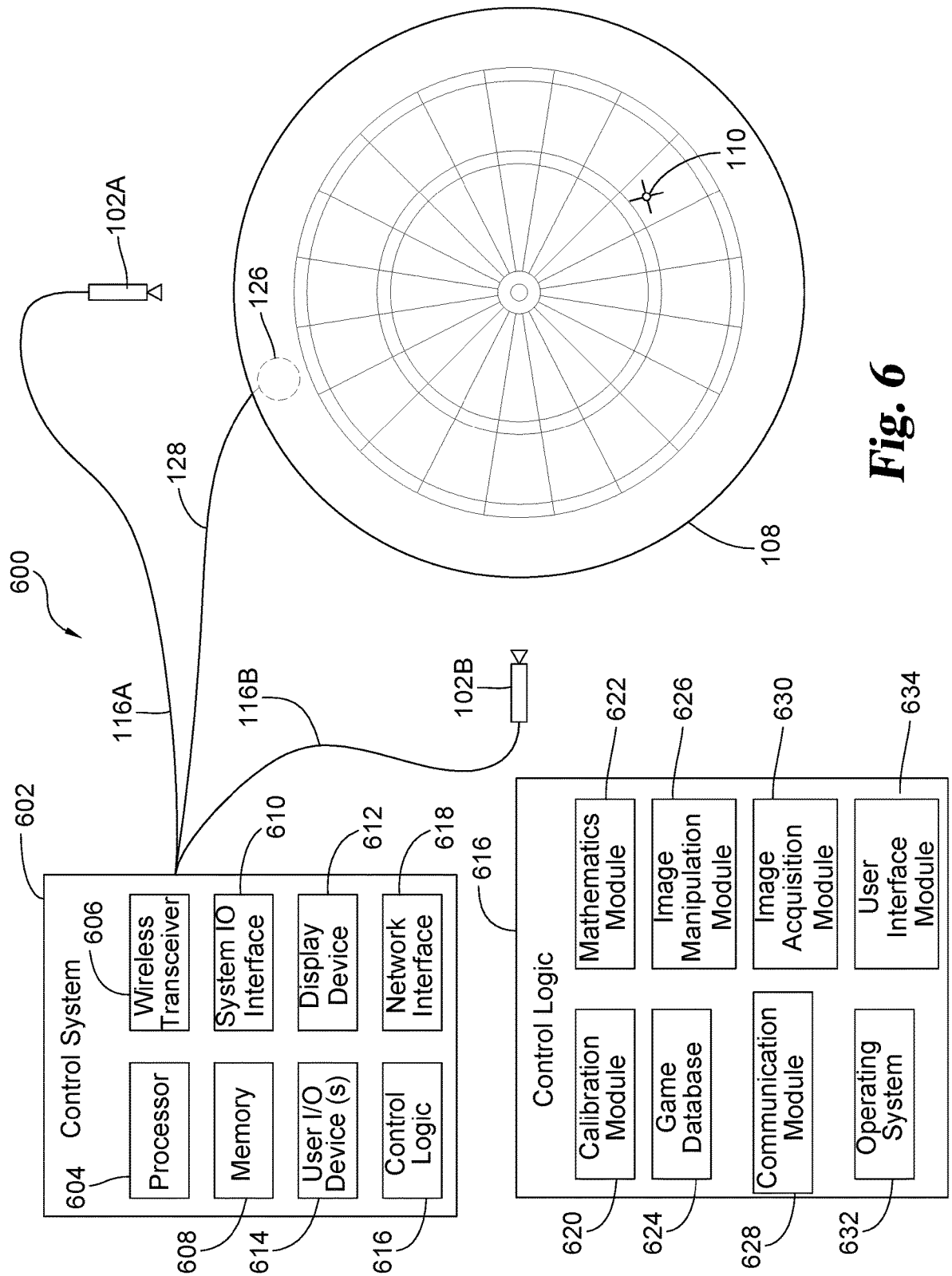
FIG. 6 is a block diagram illustrating one example of system components that may be used in a scoring system like the scoring system of FIG. 1.

One example of software and hardware components that may be used to implement the scoring system discussed herein is shown in FIG. 6 at 600. Controller 602 may include any suitable arrangement of hardware and control logic. For example, controller 602 may include a processor 604 that can be programmed to perform calculations related to locating darts based on imaged data from multiple cameras, scoring darts when the position of the dart has been calculated, displaying a user interface indicating the progress of the game, and generally controlling the flow of the game.

A wireless transceiver 206 may be included allowing controller 602 to exchange information wirelessly with various other devices such as cameras 102, or optionally with computer 112, and the like. For example, communications links 116 may be implemented via wireless technology such as WiFi, Bluetooth, and the like allowing communication between control system 202 and cameras 102 using transceiver 206.

Controller 602 may include a system I/O interface 610 for sending, receiving, and handling input and output with external devices such as cameras 102, or optionally with computer 112, and the like. A network interface 618 may be configured to interact with one or more computer networks. Interface 618 may interact directly with a computer network through a wired or wireless communications link, or by using a communications link to another electronic device that has access to a network. For example, a communications link like communications link 114 may connect controller 602 to a computer like device 112 which may then provide access to a computer network like network 124. A memory 608 may be included as well for temporarily or permanently storing images, data values, instructions, and the like.

Controller 602 may include user I/O devices 614 which includes any suitable devices for accepting input from a user such as keyboards, mice, or other I/O devices. For example, devices 614 may include a touchscreen, one or more buttons or other controls on a control panel mounted to or integrated with the controller like controller 104. Devices 614 may include buttons, keyboards, touchscreens, or other I/O devices mounted to or integrated with a computer like computer 112.

A display device 612 may be included as well for displaying a user interface generated by controller 602. In one example, the scoring system includes game and/or scoring indicators such as one or more matrix or multi-segment LED display devices integrated with a controller like controller 104. Such devices may be controlled by the system to display game, scoring, calibration, or other useful information. In another example, display device 612 is a display device like display device 122 integrated with a computer like device 112 which may be connected to the controller via wired or wireless communications links. Thus display device 612 may be a touchscreen programmed with various GUI controls such as check boxes, drop-down lists, text fields, buttons, and the like useful for accepting input and displaying output to participants.

Controller 602 may include any combination of control logic 616 which may be executed by processor 604. For example, control logic 616 may include a calibration module 620 which may configure controller 602 to initialize the state of the control system with respect to a give game and board. This initialization may include calibrating the system based on input from multiple cameras. In one example, calibration module 620 may accept input indicating where a reference point like reference point 206 or 408 appears in images retrieved by multiple cameras as disclosed herein. Calibration module 620 may also analyze calibration images showing indicia or markings or other information that is automatically readable such as indicia 310 or barcodes 308. In another example, calibration module 620 may also be useful for programmatically adjusting or "clipping", the field-of-view for one or more of the cameras in the system to reduce the amount of image data to process thus decreasing the processing time required to score darts. Programmatically clipping the field of view may also remove background information such as extraneous shapes, designs, marks, words, and the like which may be present in images captured by the camera (i.e. "background clutter"). Such background information may cause errors in the calculations when processing the position of darts. In yet another example, calibration module 620 may optionally configure controller 602 to capture initial images from the various individual cameras when the game is initialized before any darts are thrown. These initial images may be stored in memory 608, retrieved later during a game to reduce or eliminate the effect of background clutter appearing in the images captured by the cameras by canceling out this extraneous information.

An image acquisition module 630 may configure controller 602 to accept images acquired by cameras like cameras 102 or cameras 406. Image acquisition module 630 may accept a stream of images captured from cameras in the system such as in the case of video cameras taking some number of frames per second (e.g. fewer than 15 frames per second, between 15 and 30 frames per second, or more than 30 frames per second). Module 630 may combine and synchronize the image streams obtained from multiple cameras. Image acquisition module 630 may retrieve and store some or all of the frames captured by the system cameras in memory 608 and may delete frames after detecting and scoring a thrown dart. In another example, image acquisition module 630 may retrieve a single frame from each camera in the scoring system when triggered to do so.

Such triggering may occur, for example, when the system detects a dart has landed on the board, or off the board but within the area monitored by the system. Monitoring to determine when a dart has been thrown may be implemented using any suitable technology such as accelerometers or other vibration detection devices, light curtain devices that detect the presence of a dart when the dart passes through a substantially continuous beam of light, and the like.

In one example based on in FIG. 1, a sensor like sensor 126 is configured to detect throws and trigger the cameras. In this example, the sensor may be a contact (piezoelectric) microphone attached to the back of the dartboard (i.e. the side opposite the scoring surface). The sensor may capture sounds of the dart striking the board and relay the audio signals to a controller like controller 104. The board itself may advantageously operate as a filter reducing or eliminating ambient noise so that only direct impacts by darts are detected. The controller may be configured to repeatedly sample the microphone audio input signals. For example, the controller may process signals for a particular sampling period of time that is based on the length of an impact pulse determined experimentally. The controller may then calculate a Root-Mean-Square (RMS) average for the signal. If the RMS average, amplitude, frequency, or other property of the signal exceeds a previously determined target level, then the triggering may occur to begin acquiring images from the cameras.

An image manipulation module 626 may be included and may configure system 602 to perform various image analysis tasks. For example, module 626 may compare the current frame to a background frame such as a background frame captured in the calibration process, or a previously captured frame that includes darts presently on the board. Image manipulation module 626 may also be useful for identifying the edges of the shape such as a dart is in the image. Image manipulation module 626 may be used along with calibration module 622 identify calibration marks and an image, or to identify one or more reference point markings that may be present in an image captured by the cameras.

A mathematics module 622 may be useful for configuring controller 602 to make various mathematical calculations. For example mathematics module 622 may configure the system to calculate the angle of the dart with respect to the camera, calculate angles between a dart and both cameras, calculate the distance from the camera to the dart, calculate the distance from a camera to a reference point, and calculate an angle from a reference point to a dart to name a few nonlimiting examples. Mathematics module 622 may also be used to calculate a final point score once the scoring region a dart has landed in has been identified.

Control logic 616 may also include a game database 624. This database may include scoring rules that may be used by other control logic modules to determine a score for all participants at any given time during the game. Game database 624 may also include alternative board configurations and related scoring regions and rules, as well as information about players such as names, past scores, contact information, and the like. Game database 624 may be configured to accept new rules, boards, and other game configuration parameters as well as changes to existing rules. These changes may be accepted from a computer like computer 112 which may be programmed to receive the updates or new configurations from a server coupled to a network like the Internet, and send them to database 624 via a communications link like communications link 114.

A user interface module 634 may also be included and may be useful for configuring system 602 to interact with users. Such interactions may include indicating that initialization, startup, and calibration of system 602 has been completed, and the system is ready to play a game. Module 634 may also accept input from a user using an I/O device 614 indicating the user would like to start a new game. Module 634 may then initiate a new game. For example, user interface module 634 may acquire images using image acquisition module 630 and manipulate those images using image manipulation module 636 to determine if and when a dart has been thrown. Module 634 may use mathematics module 622 to calculate the location of the dart and to compare this location with rules from game database 624 to determine the scoring region the dart is in. User interface module 634 may then present the resulting score to the participant via a user interface that includes a display like display 120, or via a display device like display device 122 that is part of a computer.

Other modules that may be included in control logic 616 include a communications module 628 that may be useful for handling communications with devices in the system such as the cameras, or with other devices that are interacting with the controller such as a computer. Communications module 628 may also handle communications between the controller and other devices such as other scoring systems or computers connected via a computer network such as the Internet. Control logic 616 may also include an operating system module 632 which may be useful for maintaining device drivers for various devices used in the system, for a providing initial startup, for the initialization of other modules in the system, or for basic functions such as memory management, and the like.

Figure 7:
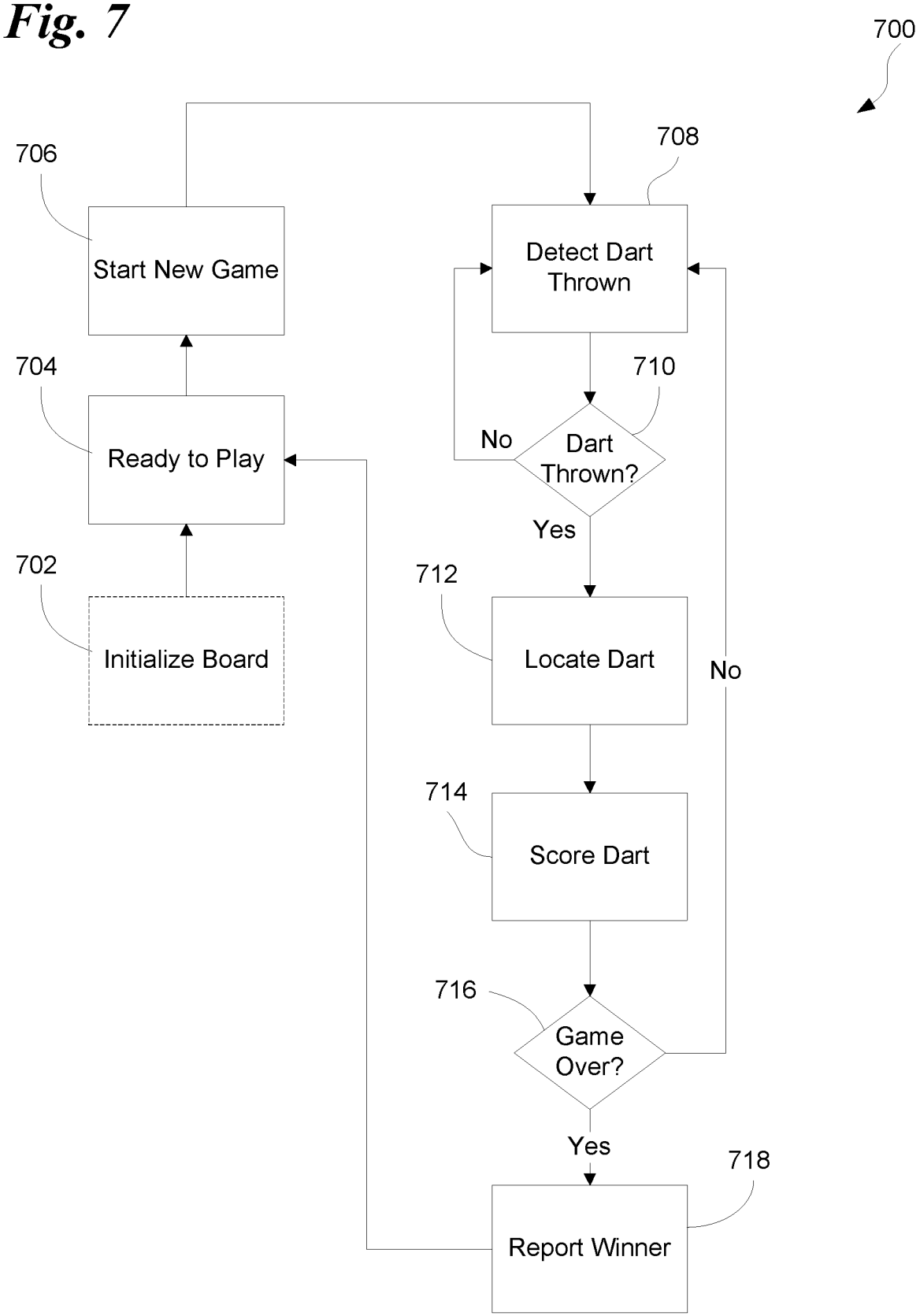
FIG. 7 is a flow diagram illustrating one example of the actions taken by a scoring system like the scoring system of FIG. 1.

Examples of the disclosed scoring system in operation are illustrated in FIGS. 7-10. In FIG. 7, one example of the overall flow of the scoring system is illustrated at 700. At 702, the system may initialize the board and prepare the system for operation. Initialization at 702 may include various calibration or self-diagnostic operations such as those performed by calibration module 620. Initialization may occur each time the system is activated, or in some cases may occur only once when the system is manufactured, or when the system is installed after it is manufactured. Initialization may also include the selection of a game stored in game database 624, and loading game rules from the database and preparing them to be executed by processor 604.

At 704, the system is ready to accept game play input from participants. At 706, one or more participants request to start a new game such as by using an I/O device 614. At 708, the system begins detecting whether a dart has been thrown by an engaging aspects of the system disclosed herein such as image acquisition module 630, image manipulation module 626, mathematics module 622, and the like. If a dart has been thrown at 710, the system locates the position of the dart at 712, and calculates a score at 714 based on rules and scoring regions for the current game. Based on the scoring results, if the game is not over at 716, the system returns to 708 and 710 to determine whether a dart is thrown in which case the scoring process repeats. If the system 602 compares the most recent scoring results to rules from game database 624 and determines that the game is over at 716, a winner is reported at 718 using any suitable user interface for display device available to the system. The system may then wait for user input 704 indicating the start of a new game at 706.

Figure 8:
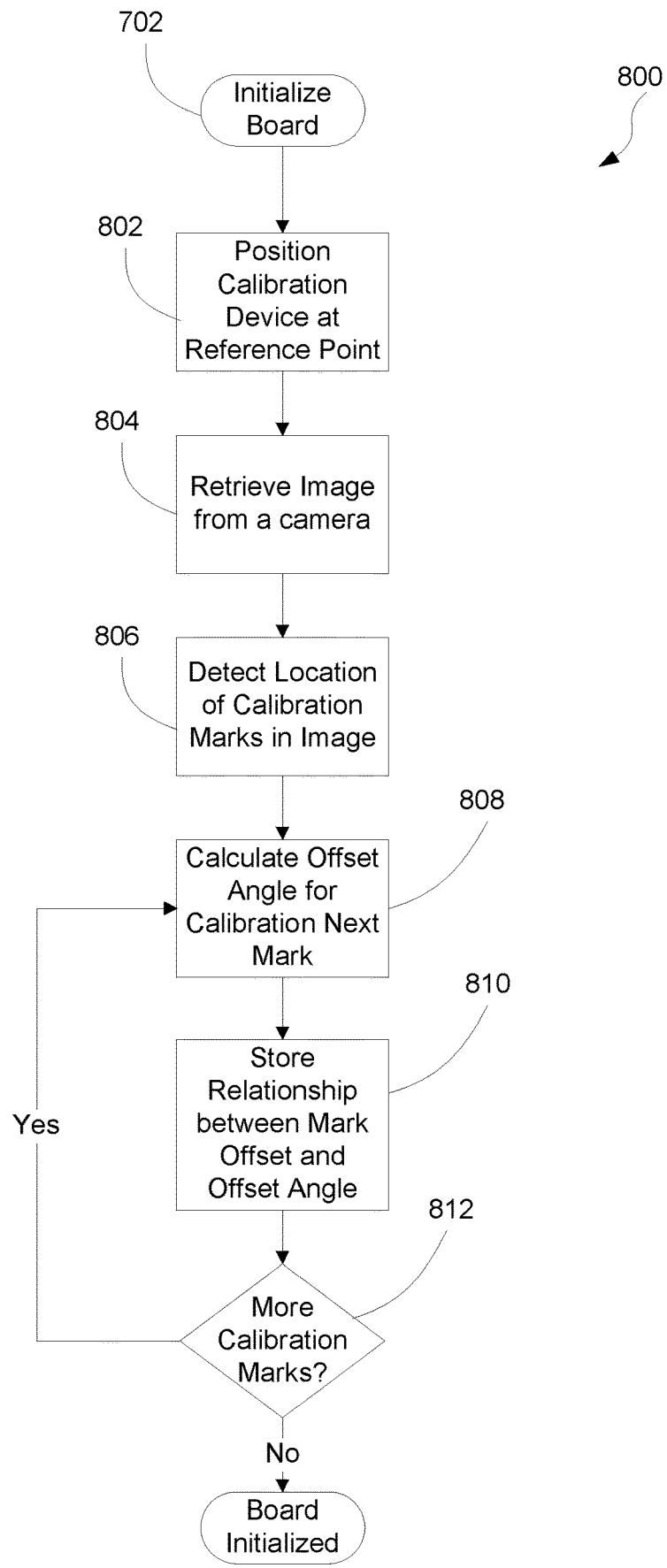
FIG. 8 is a flow diagram illustrating other actions that may be taken by a scoring system like the scoring system of FIG. 7 when the system is activated.

One example of actions taken by the system to initialize a board at 702 is illustrated in FIG. 8 at 800. For example, a calibration device such as a ruler or meter stick may be positioned adjacent the face of the board in view of each camera. The calibration device may be centered on a reference point such as reference point 206 or 408. An image may be retrieved from a camera at 804 such as by using image acquisition module 630. Algorithms like those in image manipulation module 626 and mathematics module 622 may be executed to detect the location of calibration marks in the image at 806. An offset angle may be calculated for each calibration mark as discussed above with respect to Formula 1. At 810, the relationship between angular offsets and the corresponding rows of pixels in the captured image may be stored in memory 608 as a lookup table, or may be used by mathematics module 622 to create a curve fitting formula. Any additional calibration marks may be processed at 812 until no further calculations are required. The actions taken at 800 may be performed once when the board is manufactured, when the board is installed, or multiple times such as each time the system is activated to play a game. In this example, calibration marks may be included with the board installation making it possible for the system to adjust for irregularities in the sensors or other viewing components of cameras in the system.

Figure 9:
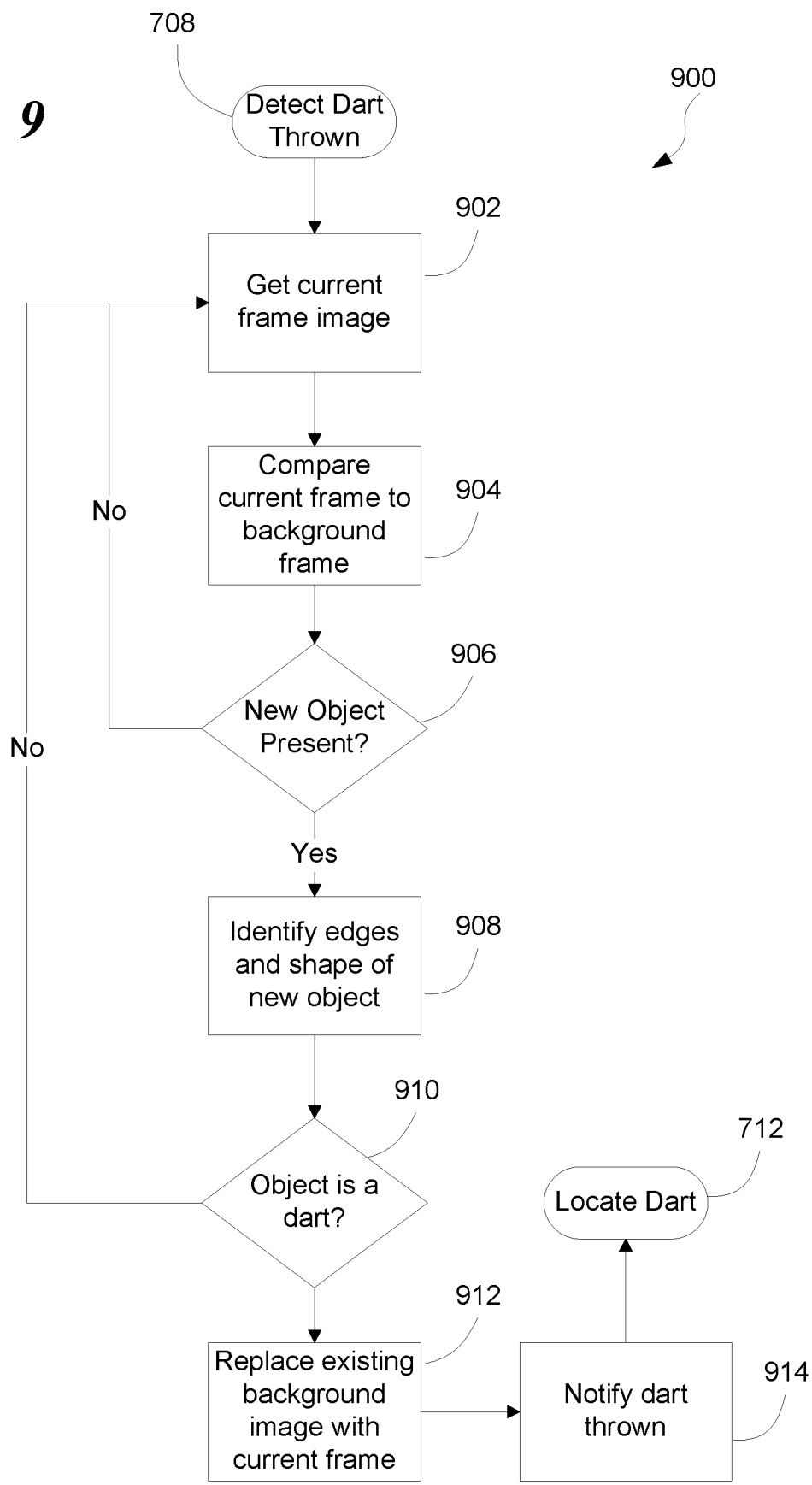
FIG. 9 is a flow diagram illustrating other actions that may be taken by a scoring system like the scoring system of FIG. 7 when detecting that a dart has been thrown.

Additional detail involved in detecting when a dart is thrown at 708 is illustrated at 900 in FIG. 9. At 902, the current frame is acquired from each of the multiple cameras in the system using image acquisition module 630. Image manipulation module 626 may be engaged to compare the current frame to one or more previously acquired frames at 904. Previously acquired frames may be used as background frames that may be used by algorithms such as those in image manipulation module 626 as image masks to subtract previously acquired pixel data thus identifying more recent pixel data. In this way, image manipulation module 626 may find new objects that may be present in the current image by ignoring background clutter and any other previously appearing objects that have already been accounted for in the cameras field-of-view. If no new objects are present at 906, the next image is acquired and may be compared to the previous image until a new object is present.

When the system detects a new object at 906, the system may identify the edges of the new object and optionally its shape as well at 908. Image manipulation module 626, and mathematics module 622 may be used in this process to perform calculations using pixel data capture by the cameras. If the object is a dart at 910, the system may replace an existing background image with the current frame to enable the system to detect the next object. The system may then optionally notify the participants that a dart has been thrown at 914 such as by an audible or visible indicator (e.g. buzzer, flashing light, a sequence of tones, and the like). Notification that the dart was thrown at 914 may also include notifying other subroutines or software modules in control logic 616 to process the most recent image data to locate the dart at 712 so that the score may be determined.

Figure 10:
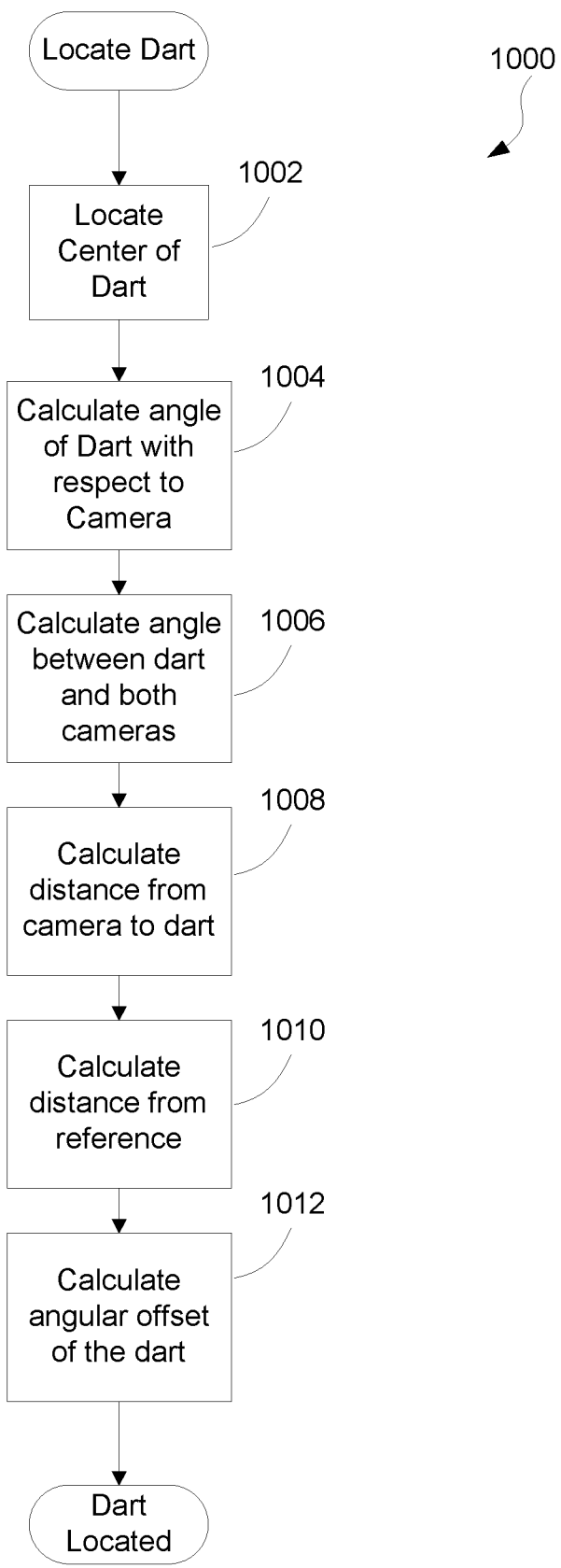
FIG. 10 is a flow diagram illustrating other actions that may be taken by a scoring system like the scoring system of FIG. 7 when locating a dart.

An example of some additional actions the system may take in locating a dart appears at 1000 in FIG. 10. For example, the center of the dart may be located at 1002 using control logic 616. Image manipulation module 626, mathematics module 622, and any other suitable modules may be employed. The control logic may be configured to calculate one or more rows of pixels representing the center of a dart on the board. In some cases, the pixels representing the center of the dart may be determined by projecting a dart tip vector from the dart body to intersect the board surface. The control logic may convert pixel coordinates from each camera into planar locations (e.g. x,y coordinate pairs) to aid in locating the dart tip.

At 1004, the system may calculate the angle of the dart with respect to the camera as discussed above with respect to angles 410 and 412 in FIG. 4. At 1006, control logic 616 may calculate an angle between the dart and both cameras, an example of which is illustrated in FIG. 4 at 426. The system may calculate the distance from a given camera to the dart at 1008, an example of which appears in FIGS. 4A and 5 as 418 and 420. A distance from a reference point such as 408 or 206 may be calculated at 1010. An example of this distance appears in FIG. 5 at 504. An angular offset like offset 502 may be calculated at 1012. In this example, the distance from a reference point and an angular offset may be used to identify the location of a dart, a location which may then be used to calculate the score.

Glossary of Definitions and Alternatives

While the invention is illustrated in the drawings and described herein, this disclosure is to be considered as illustrative and not restrictive in character. The present disclosure is exemplary in nature and all changes, equivalents, and modifications that come within the spirit of the invention are included. The detailed description is included herein to discuss aspects of the examples illustrated in the drawings for the purpose of promoting an understanding of the principles of the invention. No limitation of the scope of the invention is thereby intended. Any alterations and further modifications in the described examples, and any further applications of the principles described herein are contemplated as would normally occur to one skilled in the art to which the invention relates. Some examples are disclosed in detail, however some features that may not be relevant may have been left out for the sake of clarity.

Where there are references to publications, patents, and patent applications cited herein, they are understood to be incorporated by reference as if each individual publication, patent, or patent application were specifically and individually indicated to be incorporated by reference and set forth in its entirety herein.

Singular forms "a", "an", "the", and the like include plural referents unless expressly discussed otherwise. As an illustration, references to "a device" or "the device" include one or more of such devices and equivalents thereof.

Directional terms, such as "up", "down", "top" "bottom", "fore", "aft", "lateral", "longitudinal", "radial", "circumferential", etc., are used herein solely for the convenience of the reader in order to aid in the reader's understanding of the illustrated examples. The use of these directional terms does not in any manner limit the described, illustrated, and/or claimed features to a specific direction and/or orientation.

Multiple related items illustrated in the drawings with the same part number which are differentiated by a letter for separate individual instances, may be referred to generally by a distinguishable portion of the full name, and/or by the number alone. For example, if multiple "laterally extending elements" 90A, 90B, 90C, and 90D are illustrated in the drawings, the disclosure may refer to these as "laterally extending elements 90A-90D," or as "laterally extending elements 90," or by a distinguishable portion of the full name such as "elements 90". The language used in the disclosure are presumed to have only their plain and ordinary meaning, except as explicitly defined below. The words used in the definitions included herein are to only have their plain and ordinary meaning. Such plain and ordinary meaning is inclusive of all consistent dictionary definitions from the most recently published Webster's and Random House dictionaries. As used herein, the following definitions apply to the following terms or to common variations thereof (e.g., singular/plural forms, past/present tenses, etc.):

"Barcode" generally refers to a visible arrangement of shapes, colors, lines, dots, or symbols fixed in some medium and arranged on the medium in a pattern configured to encode data. Examples include optical machine-readable representations of data relating to an object to which the barcode is attached such as a Universal Produce Code (UPC), or any visible patterns related to any type of Automatic Identification and Data Capture (AIDC) system. Another example of a barcode is a Quick Response Code (QR Code) which arranges various light and dark shapes to encode data.

Any suitable medium is envisioned. Examples include an adhesive label, a physical page, a display device configured to display the barcode, or any other object such as a box, a statute, a machine, or other physical structure to which the barcode is affixed or upon which it is printed. For example, a bar code may be etched into metal, machined into plastic, or formed by organizing visible three-dimensional shapes into a pattern.

The barcode may not be visible to humans but may be fixed using a substance or device that allows the barcode to be visible to sensors in a machine configured to read wavelengths of light outside those detectable by the human eye. Examples of this type of barcode include barcodes printed with ink that is only visible under ultraviolet (i.e. "black") light, or barcodes displayed using infrared light.

"Board" or "dartboard" generally refers to a substantially planar structure useful as a target at which projectiles (e.g. darts) are thrown or otherwise propelled. A board may be constructed using wood, cork, plastic, or other suitable materials, and may include a scoring surface or scoring area comprising paper, clay, sisal fibers, rubber, plastic, or other suitable materials for temporarily capturing projectiles as they land on the board. The scoring surface may be divided into scoring regions or sectors. The scoring regions may be numbered or otherwise identifiable to facilitate calculation of a score value associated with projectiles landing in each separate scoring region. The scoring regions may be demarcated by raised metal, plastic, or other banding, by lines or other markings painted or otherwise applied to the surface of the board, or by lines projected onto the board by a projector.

"Camera" generally refers to an apparatus or assembly that records images of a viewing area or field-of-view on a medium or in a memory. The images may be still images comprising a single frame or snapshot of the viewing area, or a series of frames recorded over a period of time that may be displayed in sequence to create the appearance of a moving image. Any suitable media may be used to store, reproduce, record, or otherwise maintain the images.

"Communication Link" generally refers to a connection between two or more communicating entities. The communication between the communicating entities may occur by any suitable means. For example the connection may be implemented as an actual physical link, an electrical link, an electromagnetic link, a logical link, or any other suitable linkage facilitating communication.

In the case of an actual physical link, communication may occur by multiple components in the communication link configured to respond to one another by physical movement of one element in relation to another. In the case of an electrical link, the communication link may be composed of multiple electrical conductors electrically connected to form the communication link.

In the case of an electromagnetic link, the connection may be implemented by sending or receiving electromagnetic energy at any suitable frequency, thus allowing communications to pass as electromagnetic waves. These electromagnetic waves may or may not pass through a physical medium such as an optical fiber, through free space, or through any combination thereof. Electromagnetic waves may be passed at any suitable frequency including any frequency in the electromagnetic spectrum.

In the case of a logical link, the communication link may be a conceptual linkage between the sender and recipient such as a transmission station and a receiving station. Logical link may include any combination of physical, electrical, electromagnetic, or other types of communication links.

"Computer" generally refers to any computing device configured to compute a result from any number of input values or variables. A computer may include a processor for performing calculations to process input or output. A computer may include a memory for storing values to be processed by the processor, or for storing the results of previous processing. A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network or network interface to perform various network communications upon request. The network interface may be part of the computer, or characterized as separate and remote from the computer.

A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. The communication network connected to the computer may also be connected to a wider network such as the internet. Thus a computer may include one or more physical processors or other computing devices or circuitry, and may also include any suitable type of memory.

A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer.

The concept of "computer" and "processor" within a computer or computing device also encompasses any such processor or computing device serving to make calculations or comparisons as part of the disclosed system. Processing operations related to threshold comparisons, rules comparisons, calculations, and the like occurring in a computer may occur, for example, on separate servers, the same server with separate processors, or on a virtual computing environment having an unknown number of physical processors as described above. A computer may be optionally coupled to one or more visual displays and/or may include an integrated visual display. Likewise, displays may be of the same type, or a heterogeneous combination of different visual devices. A computer may also include one or more operator input devices such as a keyboard, mouse, touch screen, laser or infrared pointing device, or gyroscopic pointing device to name just a few representative examples. Also, besides a display, one or more other output devices may be included such as a printer, plotter, industrial manufacturing machine, 3D printer, and the like. As such, various display, input and output device arrangements are possible.

Multiple computers or computing devices may be configured to communicate with one another or with other devices over wired or wireless communication links to form a network. Network communications may pass through various computers operating as network appliances to such as switches, routers, firewalls or other network devices or interfaces before passing over other larger computer networks such as the internet. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

"Dart" generally refers to an object that is designed to be propelled toward a target. This includes the device commonly known by this title which can include a sharp tip, weighted body, and stabilizing fins that is designed to be propelled toward a dartboard configured to retain the dart and provide scoring information. Other examples of the general concept include any suitable projectile such as a ball, arrow, bullet, stone, or other suitable object irrespective of shape, size, weight, or preferred orientation.

"Data" generally refers to one or more values of qualitative or quantitative variables that are usually the result of measurements. Data may be considered "atomic" as being finite individual units of specific information. Data can also be thought of as a value or set of values that includes a frame of reference indicating some meaning associated with the values. For example, the number "2" alone is a symbol that absent some context is meaningless. The number "2" may be considered "data" when it is understood to indicate, for example, the number of items produced in an hour.

Data may be organized and represented in a structured format. Examples include a tabular representation using rows and columns, a tree representation with a set of nodes considered to have a parent-children relationship, or a graph representation as a set of connected nodes to name a few.

The term "data" can refer to unprocessed data or "raw data" such as a collection of numbers, characters, or other symbols representing individual facts or opinions. Data may be collected by sensors in controlled or uncontrolled environments, or generated by observation, recording, or by processing of other data. The word "data" may be used in a plural or singular form. The older plural form "datum" may be used as well.

"Database" also referred to as a "data store", "data repository", or "knowledge base" generally refers to an organized collection of data. The data is typically organized to model aspects of the real world in a way that supports processes obtaining information about the world from the data. Access to the data is generally provided by a "Database Management System" (DBMS) consisting of an individual computer software program or organized set of software programs that allow user to interact with one or more databases providing access to data stored in the database (although user access restrictions may be put in place to limit access to some portion of the data). The DBMS provides various functions that allow entry, storage and retrieval of large quantities of information as well as ways to manage how that information is organized. A database is not generally portable across different DBMSs, but different DBMSs can interoperate by using standardized protocols and languages such as Structured Query Language (SQL), Open Database Connectivity (ODBC), Java Database Connectivity (JDBC), or Extensible Markup Language (XML) to allow a single application to work with more than one DBMS.

Databases and their corresponding database management systems are often classified according to a particular database model they support. Examples include a DBMS that relies on the "relational model" for storing data, usually referred to as Relational Database Management Systems (RDBMS). Such systems commonly use some variation of SQL to perform functions which include querying, formatting, administering, and updating an RDBMS. Other examples of database models include the "object" model, the "object-relational" model, the "file", "indexed file" or "flat-file" models, the "hierarchical" model, the "network" model, the "document" model, the "XML" model using some variation of XML, the "entity-attribute-value" model, and others.

Examples of commercially available database management systems include PostgreSQL provided by the PostgreSQL Global Development Group; Microsoft SQL Server provided by the Microsoft Corporation of Redmond, Wash., USA; MySQL and various versions of the Oracle DBMS, often referred to as simply "Oracle" both separately offered by the Oracle Corporation of Redwood City, Calif., USA; the DBMS generally referred to as "SAP" provided by SAP SE of Walldorf, Germany; and the DB2 DBMS provided by the International Business Machines Corporation (IBM) of Armonk, N.Y., USA.

The database and the DBMS software may also be referred to collectively as a "database". Similarly, the term "database" may also collectively refer to the database, the corresponding DBMS software, and a physical computer or collection of computers. Thus the term "database" may refer to the data, software for managing the data, and/or a physical computer that includes some or all of the data and/or the software for managing the data.

"Detent" generally refers to a device for positioning and holding one mechanical part in relation to another in a manner such that the device can be released by force applied to one of the parts. Examples any mechanical device for holding, gripping, or fastening that consist of a spike, bar, hook, catch, or ball, with or without a biasing element to maintain the one mechanical part in relation to the other.

"Display device" generally refers to any device capable of being controlled by an electronic circuit or processor to display information in a visual or tactile. A display device may be configured as an input device taking input from a user or other system (e.g. a touch sensitive computer screen), or as an output device generating visual or tactile information, or the display device may configured to operate as both an input or output device at the same time, or at different times.

The output may be two-dimensional, three-dimensional, and/or mechanical displays and includes, but is not limited to, the following display technologies: Cathode ray tube display (CRT), Light-emitting diode display (LED), Electroluminescent display (ELD), Electronic paper, Electrophoretic Ink (E-ink), Plasma display panel (PDP), Liquid crystal display (LCD), High-Performance Addressing display (HPA), Thin-film transistor display (TFT), Organic light-emitting diode display (OLED), Surface-conduction electron-emitter display (SED), Laser TV, Carbon nanotubes, Quantum dot display, Interferometric modulator display (IMOD), Swept-volume display, Varifocal mirror display, Emissive volume display, Laser display, Holographic display, Light field displays, Volumetric display, Ticker tape, Split-flap display, Flip-disc display (or flip-dot display), Rollsign, mechanical gauges with moving needles and accompanying indicia, Tactile electronic displays (aka refreshable Braille display), Optacon displays, or any devices that either alone or in combination are configured to provide visual feedback on the status of a system, such as the "check engine" light, a "low altitude" warning light, an array of red, yellow, and green indicators configured to indicate a temperature range.

"Input Device" generally refers to a device coupled to a computer that is configured to receive input and deliver the input to a processor, memory, or other part of the computer. Such input devices can include keyboards, mice, trackballs, touch sensitive pointing devices such as touchpads, or touchscreens. Input devices also include any sensor or sensor array for detecting environmental conditions such as temperature, light, noise, vibration, humidity, and the like.

"Index" generally refers to an indicator, guide, sign, gauge, signal, token, or mark used to precisely and accurately position one object into a proper spatial relationship with another. The index may or may not require physical interaction between the two objects. For example, a peg may index a proper position by holding one object in the proper relationship with another. Similarly, a magnet on one object may be operable as an index when used in conjunction with another magnet or ferromagnetic item attached to the second object.

"Memory" generally refers to any storage system or device configured to retain data or information. Each memory may include one or more types of solid-state electronic memory, magnetic memory, or optical memory, just to name a few. Memory may use any suitable storage technology, or combination of storage technologies, and may be volatile, nonvolatile, or a hybrid combination of volatile and nonvolatile varieties. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM).

Memory can refer to Dynamic Random Access Memory (DRAM) or any variants, including static random access memory (SRAM), Burst SRAM or Synch Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (REDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM).

Memory can also refer to non-volatile storage technologies such as non-volatile read access memory (NVRAM), flash memory, non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Domain Wall Memory (DWM) or "Racetrack" memory, Nano-RAM (NRAM), or Millipede memory. Other non-volatile types of memory include optical disc memory (such as a DVD or CD ROM), a magnetically encoded hard disc or hard disc platter, floppy disc, tape, or cartridge media. The concept of a "memory" includes the use of any suitable storage technology or any combination of storage technologies.

"Module" or "Engine" generally refers to a collection of computational or logic circuits implemented in hardware, or to a series of logic or computational instructions expressed in executable, object, or source code, or any combination thereof, configured to perform tasks or implement processes. A module may be implemented in software maintained in volatile memory in a computer and executed by a processor or other circuit. A module may be implemented as software stored in an erasable/programmable nonvolatile memory and executed by a processor or processors. A module may be implanted as software coded into an Application Specific Information Integrated Circuit (ASIC). A module may be a collection of digital or analog circuits configured to control a machine to generate a desired outcome.

Modules may be executed on a single computer with one or more processors, or by multiple computers with multiple processors coupled together by a network. Separate aspects, computations, or functionality performed by a module may be executed by separate processors on separate computers, by the same processor on the same computer, or by different computers at different times.

"Multiple" as used herein is synonymous with the term "plurality" and refers to more than one, or by extension, two or more.

"Network" or "Computer Network" generally refers to a telecommunications network that allows computers to exchange data. Computers can pass data to each other along data connections by transforming data into a collection of datagrams or packets. The connections between computers and the network may be established using either cables, optical fibers, or via electromagnetic transmissions such as for wireless network devices.

Computers coupled to a network may be referred to as "nodes" or as "hosts" and may originate, broadcast, route, or accept data from the network. Nodes can include any computing device such as personal computers, phones, servers as well as specialized computers that operate to maintain the flow of data across the network, referred to as "network devices". Two nodes can be considered "networked together" when one device is able to exchange information with another device, whether or not they have a direct connection to each other.

Examples of wired network connections may include Digital Subscriber Lines (DSL), coaxial cable lines, or optical fiber lines. The wireless connections may include BLUETOOTH, Worldwide Interoperability for Microwave Access (WiMAX), infrared channel or satellite band, or any wireless local area network (Wi-Fi) such as those implemented using the Institute of Electrical and Electronics Engineers' (IEEE) 802.11 standards (e.g. 802.11(a), 802.11(b), 802.11(g), or 802.11(n) to name a few). Wireless links may also include or use any cellular network standards used to communicate among mobile devices including 1G, 2G, 3G, or 4G. The network standards may qualify as 1G, 2G, etc. by fulfilling a specification or standards such as the specifications maintained by International Telecommunication Union (ITU). For example, a network may be referred to as a "3G network" if it meets the criteria in the International Mobile Telecommunications-2000 (IMT-2000) specification regardless of what it may otherwise be referred to. A network may be referred to as a "4G network" if it meets the requirements of the International Mobile Telecommunications Advanced (IMTAdvanced) specification. Examples of cellular network or other wireless standards include AMPS, GSM, GPRS, UMTS, LTE, LTE Advanced, Mobile WiMAX, and WiMAX-Advanced.

Cellular network standards may use various channel access methods such as FDMA, TDMA, CDMA, or SDMA. Different types of data may be transmitted via different links and standards, or the same types of data may be transmitted via different links and standards.

The geographical scope of the network may vary widely. Examples include a body area network (BAN), a personal area network (PAN), a local-area network (LAN), a metropolitan area network (MAN), a wide area network (WAN), or the Internet.

A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks.

A network may utilize different communication protocols or messaging techniques including layers or stacks of protocols. Examples include the Ethernet protocol, the internet protocol suite (TCP/IP), the ATM (Asynchronous Transfer Mode) technique, the SONET (Synchronous Optical Networking) protocol, or the SDE1 (Synchronous Digital Elierarchy) protocol. The TCP/IP internet protocol suite may include application layer, transport layer, internet layer (including, e.g., 1Pv6), or the link layer.

"Output Device" generally refers to any device or collection of devices that is controlled by computer to produce an output. This includes any system, apparatus, or equipment receiving signals from a computer to control the device to generate or create some type of output. Examples of output devices include, but are not limited to, screens or monitors displaying graphical output, any projector a projecting device projecting a two-dimensional or three-dimensional image, any kind of printer, plotter, or similar device producing either two-dimensional or three-dimensional representations of the output fixed in any tangible medium (e.g. a laser printer printing on paper, a lathe controlled to machine a piece of metal, or a three-dimensional printer producing an object). An output device may also produce intangible output such as, for example, data stored in a database, or electromagnetic energy transmitted through a medium or through free space such as audio produced by a speaker controlled by the computer, radio signals transmitted through free space, or pulses of light passing through a fiber-optic cable.

"Personal computing device" generally refers to a computing device configured for use by individual people. Examples include mobile devices such as Personal Digital Assistants (PDAs), tablet computers, wearable computers installed in items worn on the human body such as in eye glasses, laptop computers, portable music/video players, computers in automobiles, or cellular telephones such as smart phones. Personal computing devices can be devices that are typically not mobile such as desk top computers, game consoles, or server computers. Personal computing devices may include any suitable input/output devices and may be configured to access a network such as through a wireless or wired connection, and/or via other network hardware.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement, such as one or more PENTIUM, i3, i5 or i7 processors supplied by INTEL Corporation of Santa Clara, Calif., USA. Other examples of commercially available processors include but are not limited to the X8 and Freescale Coldfire processors made by Motorola Corporation of Schaumburg, Ill., USA; the ARM processor and TEGRA System on a Chip (SoC) processors manufactured by Nvidia of Santa Clara, Calif., USA; the POWER7 processor manufactured by International Business Machines of White Plains, N.Y., USA; any of the FX, Phenom, Athlon, Sempron, or Opteron processors manufactured by Advanced Micro Devices of Sunnyvale, Calif., USA; or the Snapdragon SoC processors manufactured by Qalcomm of San Diego, Calif., USA.

A processor also includes Application-Specific Integrated Circuit (ASIC). An ASIC is an Integrated Circuit (IC) customized to perform a specific series of logical operations is controlling a computer to perform specific tasks or functions. An ASIC is an example of a processor for a special purpose computer, rather than a processor configured for general-purpose use. An application-specific integrated circuit generally is not reprogrammable to perform other functions and may be programmed once when it is manufactured.

In another example, a processor may be of the "field programmable" type. Such processors may be programmed multiple times "in the field" to perform various specialized or general functions after they are manufactured. A field-programmable processor may include a Field-Programmable Gate Array (FPGA) in an integrated circuit in the processor. FPGA may be programmed to perform a specific series of instructions which may be retained in nonvolatile memory cells in the FPGA. The FPGA may be configured by a customer or a designer using a hardware description language (HDL). In FPGA may be reprogrammed using another computer to reconfigure the FPGA to implement a new set of commands or operating instructions. Such an operation may be executed in any suitable means such as by a firmware upgrade to the processor circuitry.

Just as the concept of a computer is not limited to a single physical device in a single location, so also the concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, the unknown number may automatically change over time as well.

The concept of a "processor" includes a device configured or programmed to make threshold comparisons, rules comparisons, calculations, or perform logical operations applying a rule to data yielding a logical result (e.g. "true" or "false"). Processing activities may occur in multiple single processors on separate servers, on multiple processors in a single server with separate processors, or on multiple processors physically remote from one another in separate computing devices.

"Rule" generally refers to a conditional statement with at least two outcomes. A rule may be compared to available data which can yield a positive result (all aspects of the conditional statement of the rule are satisfied by the data), or a negative result (at least one aspect of the conditional statement of the rule is not satisfied by the data). One example of a rule is shown below as pseudo code of an "if/then/else" statement that may be coded in a programming language and executed by a processor in a computer:

```
if(clouds.areGrey( ) and
(clouds.numberOfClouds > 100)) then {
  prepare for rain;
} else {
  Prepare for sunshine;
}
```

"Solid Angle" generally refers to the two-dimensional angle in three-dimensional space that an object subtends at a viewing point. Put another way, it is a measure of how large the object appears to an observer looking from the viewing point.

"Sensor" generally refers to a transducer whose purpose is to sense or detect a property or characteristic of the environment. Sensors may be constructed to provide an output corresponding to the detected property or characteristic, such output may be an electrical or electromagnetic signal, a mechanical adjustment of one part in relation to another, or a changing visual cue such as rising or falling mercury in a thermometer. A sensor's sensitivity indicates how much the sensor's output changes when the property being measured changes.

A few non-limiting examples of sensors include: Pressure sensors, ultrasonic sensors, humidity sensors, gas sensors, Passive Infra-Red (PIR) motion sensors, acceleration sensors (sometimes referred to as an "accelerometer"), displacement sensors, and/or force measurement sensors. Sensors may be responsive to any property in the environment such as light, motion, temperature, magnetic fields, gravity, humidity, moisture, vibration, pressure, electrical fields, sound, stretch, the concentration or position of certain molecules (e.g. toxins, nutrients, and bacteria), or the level or presence of metabolic indicators, such as glucose or oxygen.

"Triggering a Rule" generally refers to an outcome that follows when all elements of a conditional statement expressed in a rule are satisfied. In this context, a conditional statement may result in either a positive result (all conditions of the rule are satisfied by the data), or a negative result (at least one of the conditions of the rule is not satisfied by the data) when compared to available data. The conditions expressed in the rule are triggered if all conditions are met causing program execution to proceed along a different path than if the rule is not triggered.

"Viewing Area", "Field of View", or "Field of Vision" is the extent of the observable world that is seen at any given moment. In case of optical instruments, cameras, or sensors, it is a solid angle through which a detector is sensitive to electromagnetic radiation that include light visible to the human eye, and any other form of electromagnetic radiation that may be invisible to humans.

What is claimed is:
1. A method of automatically scoring a dart game, comprising:
 capturing reference images using multiple cameras positioned around a dartboard, the dartboard defining multiple scoring regions having multiple corresponding scores associated with them, wherein the multiple cameras are controlled by an image acquisition module to capture the reference images before a dart hits the dartboard, wherein the multiple cameras are positioned to capture different fields of view that are substantially perpendicular to a front surface of the dartboard;

capturing scoring images from the cameras after a dart has been thrown using the image acquisition module;

subtracting the reference images from the scoring images to determine an image location of the dart within each cameras' field of view using an image manipulation module. triangulating a position of the dart on the front surface of the dartboard dart using a mathematics module;

applying one or more scoring rules to determine a score value for the dart based on the position of the dart and the one or more scoring rules using the mathematics module;

updating the score of the dart game using the mathematics module based on the one or more scoring rules and the score value; and displaying the updated score on a display device.

2. The method of claim 1, comprising:

detecting that a dart has been thrown using a sensor adjacent the dartboard.

3. The method of claim 1, wherein the multiple cameras are controlled by an image acquisition module to capture the reference images before a dart hits the dartboard, and wherein the reference images are stored in a memory.

4. The method of claim 1, wherein the field of view extends across the front surface of the dartboard.

5. The method of claim 1, wherein triangulating a position of the dart on the front surface of the dartboard includes determining the corresponding scoring region the dart is resting in using the image location of the dart.

6. The method of claim 1, wherein triangulating the position of the dart includes calculating the position relative to a predetermined reference point on the dartboard based on the location of the dart within the scoring images.

7. The method of claim 1, wherein triangulating the position of the dart includes calculating a distance from a predetermined reference point on the dartboard to the dart, and an angular offset of the dart relative to the predetermined reference point.

8. The method of claim 1, wherein calculating a location of the dart in the scoring images includes calculating a center pixel, or row of pixels, corresponding to a tip of the dart, and one or more pixels for at least one edge of the dart.

9. The method of claim 1, wherein the field of view of the multiple cameras is offset forward from the front surface of the dartboard by a predetermined offset distance, and wherein calculating a location of the dart includes calculating a vector passing through a center of the dart where the dart enters an upper edge of a scoring image, and another center of the dart where the dart exits a lower edge of the same scoring image; and calculating where the dart intersects the front surface of the dartboard based on the predetermined offset distance and an angle of the vector relative to the dartboard.

10. The method of claim 1, comprising:

using the scoring images as reference images to determine the location of the next dart.

11. The method of claim 1, wherein a first camera of the multiple cameras is positioned at a predetermined angle with respect to a second camera of the multiple cameras.

12. The method of claim 1, wherein a first camera of the multiple cameras is positioned at a predetermined angle of about 90 degrees with respect to a second camera of the multiple cameras.

13. The method of claim 5, wherein the dartboard includes positioning indicia on an edge portion of the dartboard corresponding to each of the scoring regions, wherein the edge portion is substantially perpendicular to the front surface of the dartboard and is captured in calibrating images captured by each of the multiple cameras controlled by the image acquisition module, and wherein a calibration module uses the calibration images to determine a location of each of the multiple cameras relative to a perimeter of the dartboard.

14. The method of claim 1, comprising:

emitting light towards a screen using one or more lights positioned around the dartboard adjacent to an edge portion of the dartboard, wherein the screen is within the field of view of each camera, and wherein the edge portion of the dartboard is substantially perpendicular to the front surface of the dartboard and is outside the field of view of each of the multiple cameras.

15. The method of claim 1, comprising:

emitting light through a screen using one or more lights mounted outside the screen, the screen positioned around the dartboard with the dartboard inside the screen, and the inside of the screen being within the field of view of each of the multiple cameras;

wherein a portion of the light passes through the screen and is visible to the multiple cameras.

16. The method of claim 14, wherein at least one of the multiple cameras is configured to detect light that has a wavelength of less than about 350 nanometers or more than about 800 nanometers.

17. A method of automatically locating a dart on a dartboard, comprising:

using a first camera with a first field of view to capture a first reference image, and a second camera with a second field of view that is different from the first field of view to capture a second reference image, wherein the first and second cameras are responsive to a controller, wherein the first and second fields of view are substantially perpendicular to a front surface of the dartboard and extend across a front surface of a dartboard;

capturing a first dart image of a dart on the front surface of the board using the first camera, and a second dart image of the dart using the second camera; and using the controller to determine a location of the dart by subtracting the first reference image from the first dart image, and the second reference image from the second dart image.

18. The method of claim 17, comprising:

using the controller to determine a scoring region corresponding to the location of the dart;

using the controller to adjust a score for a dart game based on the score value; and displaying the adjusted score on a display device using the controller.

19. The method of claim 17, comprising:

subtracting the first reference image from the first dart image, and the second reference image from the second dart image using the controller to determine image data indicating a location of the dart in the first and second images.

20. The method of claim 17, comprising:

calculating a first angle between the dart and the first camera using the controller and the first reference image, and a second angle between the dart and the second camera using the controller and the second reference image.

21. The method of claim 17, comprising:
calculating a distance to the dart from a predetermined reference point, and an angular offset of the dart relative to the reference point using the controller and the first and second angles.

22. The method of claim 21, comprising:
triangulating a position of the dart on the dartboard using the controller based on the distance and the angular offset.

23. The method of claim 17, comprising:
detecting a dart has been thrown at a dartboard using a sensor coupled to the controller, the sensor positioned adjacent the dartboard.

24. The method of claim 21, comprising:
calculating a first distance from the first camera to the dart using the controller and the first angle;
calculating a second distance from the second camera to the dart using the controller and the second angle.

25. The method of claim 21, wherein the first angle is calculated relative to the predetermined reference point, the dart, and the first camera, and wherein the second angle is calculated relative to the predetermined reference point, the dart, and the second camera.

26. The method of claim 17, comprising:
emitting light towards a screen using one or more lights positioned on an edge portion of the dartboard, wherein said edge portion is outside the first and second fields of view, and wherein the screen surrounds the dartboard, and wherein the screen appears behind the dart in the first and second fields of view.

27. The method of claim 17, comprising:
emitting light onto a screen using one or more lights positioned on a mount, wherein the mount is on a side of the screen opposite of the dartboard, wherein the screen surrounds the dartboard, wherein a portion of the emitted light passes through the screen, and wherein the screen appears behind the dart in the first and second fields of view.

28. The method of claim 17, comprising:
capturing a first and second calibrating image from the first and second cameras respectively; and
calculating the position of the first and second cameras relative to a perimeter of the dartboard using the controller and location specific indicia on an edge portion of the dartboard that are visible in the first and second calibrating images.

29. The method of claim 17, comprising:
using the controller to determine a board configuration for the dartboard, and one or more scoring rules based on input received from a user via an input device coupled to the controller;
wherein the board configuration and scoring rules are selected from a database of games stored in a memory in the controller.

* * * * *